(12) United States Patent
Isshiki

(10) Patent No.: US 8,914,643 B2
(45) Date of Patent: Dec. 16, 2014

(54) ANONYMOUS AUTHENTICATION SYSTEM AND ANONYMOUS AUTHENTICATION METHOD

(75) Inventor: Toshiyuki Isshiki, Tokyo (JP)

(73) Assignee: NEC Corporation, Tokyo (JP)

( * ) Notice: Subject to any disclaimer, the term of this patent is extended or adjusted under 35 U.S.C. 154(b) by 1025 days.

(21) Appl. No.: 12/601,422

(22) PCT Filed: May 21, 2008

(86) PCT No.: PCT/JP2008/059307
§ 371 (c)(1),
(2), (4) Date: Nov. 23, 2009

(87) PCT Pub. No.: WO2008/146667
PCT Pub. Date: Dec. 4, 2008

(65) Prior Publication Data
US 2010/0174911 A1    Jul. 8, 2010

(30) Foreign Application Priority Data

May 24, 2007  (JP) ................................ 2007-137852

(51) Int. Cl.
| | |
|---|---|
| H04L 9/32 | (2006.01) |
| G06F 21/20 | (2006.01) |
| G06F 21/31 | (2013.01) |
| G06F 21/62 | (2013.01) |

(52) U.S. Cl.
CPC ........... *H04L 9/3271* (2013.01); *H04L 2209/42* (2013.01); *H04L 9/3257* (2013.01); *G06F 21/31* (2013.01); *G06F 21/6263* (2013.01)
USPC ............................................. 713/182; 726/2

(58) Field of Classification Search
USPC .............................................. 713/182; 726/2
See application file for complete search history.

(56) References Cited

U.S. PATENT DOCUMENTS

| | | | | |
|---|---|---|---|---|
| 7,234,059 | B1 * | 6/2007 | Beaver et al. ................. | 713/170 |
| 7,264,152 | B2 * | 9/2007 | Tsuei et al. .................... | 235/380 |

(Continued)

FOREIGN PATENT DOCUMENTS

| | | |
|---|---|---|
| JP | 2004-112539 A | 4/2004 |
| JP | 2006-13790 A | 1/2006 |

(Continued)

OTHER PUBLICATIONS

Jan Camenisch et al., Group Signatures: Better Efficiency and New Theoretical Aspects, Forth Int. Conf. on Security in Communication Networks, SCN 2004, LNCS 3352, Springer, 2005, pp. 1-18.

Shoko Yonezawa et al., On the Applications of Group Signatures, The 2007 Symposium on Cryptography and Information Security, Jan. 2007, pp. 1-6.

Toshiyuki Isshiki et al., Using Group Signatures for Identity Management and its Implementation, Proceedings of the Second ACM Workshop on Digital Identity Management, Conference on Computer and Communications Security, Nov. 3, 2006, pp. 73-78.

(Continued)

*Primary Examiner* — Azizul Choudhury
*Assistant Examiner* — Tariq Najee-Ullah
(74) *Attorney, Agent, or Firm* — Foley & Lardner LLP

(57) ABSTRACT

A disclosed anonymous authentication system comprises a group management device, an authentication-subjected user device, a verification device and an authentication-subjected user identification device. A user previously registers a verification key in the group management device such that his signature can be verified. For authentication, the user generates his or her own signature using the authentication-subjected user device, and encrypts the signature using an encryption key of the group to generate authentication data. The verification device authenticates the signature in collaboration with a verification assistant who has a decryption key of the group. The authentication-subjected user identification device that has the decryption key of the group decrypts the authentication data as required to identify a user who is to be authenticated.

9 Claims, 14 Drawing Sheets

(56) References Cited

U.S. PATENT DOCUMENTS

| | | | |
|---|---|---|---|
| 7,472,277 B2 * | 12/2008 | Halcrow et al. | 713/175 |
| 7,516,326 B2 * | 4/2009 | Pinkas | 713/170 |
| 8,078,876 B2 * | 12/2011 | Brickell et al. | 713/176 |
| 8,356,181 B2 * | 1/2013 | Brickell et al. | 713/180 |
| 8,499,158 B2 * | 7/2013 | Lee et al. | 713/176 |
| 8,583,932 B2 * | 11/2013 | Furukawa | 713/176 |
| 8,645,690 B2 * | 2/2014 | Lee et al. | 713/168 |
| 2005/0097336 A1 * | 5/2005 | Canard et al. | 713/185 |
| 2006/0062394 A1 | 3/2006 | Kamijo | |
| 2006/0155985 A1 * | 7/2006 | Canard et al. | 713/156 |
| 2008/0201262 A1 * | 8/2008 | Saito et al. | 705/50 |
| 2008/0307223 A1 * | 12/2008 | Brickell et al. | 713/158 |
| 2009/0028330 A1 | 1/2009 | Kamijo | |
| 2009/0041239 A1 * | 2/2009 | Teranishi | 380/46 |

FOREIGN PATENT DOCUMENTS

| | | |
|---|---|---|
| JP | 2006-203819 A | 8/2006 |
| JP | 2006-235661 A | 9/2006 |

OTHER PUBLICATIONS

Hirohisa Ogawa et al., A Note on Method of Disclosing Personal Information, Institute of Information Security, The Institute of Electronics, Information and Communication Engineers, 2006, p. 179.

Ronald Cramer et al., Design and Analysis of Practical Public—Key Encryption Schemes Secure Against Adaptive Chosen Ciphertext Attack, Aug. 14, 2003, pp. 1-66.

Ronald Cramer et al., Signature Schemes Based on the Strong RSA Assumption, Jul. 27, 1999, pp. 1-16.

R. L. Rivest et al., A Method for Obtaining Digital Signatures and Public-Key Cryptosystems, Apr. 4, 1977, pp. 1-15.

Mihir Bellare et al. Optimal Asymmetric Encryption—How to Encrypt with RSA, Nov. 19, 1995, pp. 1-19.

Amos Fiat et al., How to Prove Yourself: Practical Solutions to Identification and Signature Problems, The Weizmann Institute of Science, Department of Applied Mathematics, 1998, pp. 187-194.

Mihir Bellare et al., Keying Hash Functions for Message Authentication, Jun. 1996, pp. 1-19.

* cited by examiner

ANONYMOUS AUTHENTICATION SYSTEM AND ANONYMOUS AUTHENTICATION METHOD

TECHNICAL FIELD

The present invention relates to an anonymous authentication system and an anonymous authentication method.

BACKGROUND ART

In recent years, the importance of network security has been widely recognized. For ensuring security, a variety of services on networks are configured to be provided to only specified individuals. For this reason, these services entail personal authentication for a service user before the user can utilize a service. However, a plurality of historical data collected in the course of authentication reveal private information as to when, where, and what the same service user has done, resulting in a violation of the individual's privacy. Accordingly, from the viewpoint of privacy, it can be said that the personal authentication should be desirably done as least frequently as possible.

As a measure for increasing the anonymity of a user who is to be authenticated, a method may be contemplated in which the same ID and password is issued to all members of a service. Since this method authenticates all members using the same ID and password, the authentication can be done without identifying individuals. However, if any of the members betrays the password to a person other than the members, a new password must be issued and transmitted to all the members in order to provide the service to only the members. In addition, even if the behavior of a user who is to be authenticated includes an operation which may break an agreement and the like so that the user who is to be authenticated will be identified, the manager cannot identify the user who is to be authenticated.

Patent Document 1 describes an anonymous authentication scheme. This anonymous authentication scheme is an authentication scheme which allows a manager to identify and/or exclude a user who is to be authenticated as necessary, while maintaining the anonymity of the user who is to be authenticated. This anonymous authentication system further allows anyone to determine whether the authentications that are carried out a plurality of times are actions performed by the same user who is to be authenticated or by different users who are to be authenticated. This has the advantage that in a for-profit members-only service and the like, the manager can acquire information on repeatedly access members, but is problematic in that if a particular user who is to be authenticated is identified for some reason, a past authentication history of the user who is to be authenticated is revealed in its entirety. Moreover, the anonymous authentication scheme of Patent Document 1 suffers from a problem in which since the manager knows the IDs and passwords of all members, the manger can act while disguised as a member.

Further, Non-Patent Document 1 describes an anonymous authentication scheme which employs a group signature. According to these anonymous authentication schemes, it is impossible to determine whether authentications that are carried out a plurality of times are actions performed by the same user who is to be authenticated or by different users who are to be authenticated, and a manager is prevented from taking action disguised as another member. However, these schemes present a problem in which a large calculation cost is involved for generating data (hereinafter referred to as "authentication data") that is necessary for authenticating a user who is to be authenticated.

Patent Document 1: JP2006-235661A

Non-Patent Document 1: J. Camenisch and J. Groth. Group signatures: better efficiency and new theoretical aspects. Forth Int. Conf. on Security in Communication Networks—SCN 2004, LNCS 3352, Springer, 2005.

DISCLOSURE OF THE INVENTION

Problems to be Solved by the Invention

It is an object of the present invention to provide an anonymous authentication system and an anonymous authentication method which are capable, when necessary, of preventing a user who is to be authenticated from remaining anonymous, while ensuring the anonymity of users who are to be authenticated, and which are not capable of determining whether authentications that are carried out a plurality of times are actions performed by the same user who is to be authenticated or by different users who are to be authenticated, and which prevent a group manager who is responsible for managing a group from taking action disguised as a member, and which require a lower calculation costs for generating authentication data for a user who is to be authenticated.

Means for Solving the Problems

According to one aspect of the present invention, an anonymous authentication system comprises: a group management device for managing a group of users; an authentication-subjected user device that is manipulated by a user who is to be authenticated and who belongs to the group managed by the group management device for requesting authentication; a verification device for verifying that a user attempting authentication belongs to the group; a verification assistant device for assisting in the verifying operation, and an authentication-subjected user identification device for identifying a user who is to be authenticated. The authentication-subjected user device comprises an unlinkable authentication data generation section for generating unlinkable authentication data which does not enable anyone to determine whether authentications that are carried out a plurality of times are actions performed by the same user who is to be authenticated or by different users who are to be authenticated. The verification device comprises a verification assist request section for outputting a verification assist request to request the verification assistant device to perform a verification assisting operation, and a verification section for receiving verification assist data from the verification assistant device which has responded to the verification assist request, for receiving the unlinkable authentication data from the authentication-subjected user device, and for outputting a verification result. The authentication-subjected user identification device comprises an authentication-subjected user identification section for receiving the unlinkable authentication data and a secret key of the group, and for identifying a user who is to be authenticated.

According to another aspect of the present invention, an anonymous authentication system comprises a group management device for managing a group of users, an authentication-subjected user device that is manipulated by a user who is to be authenticated and who belongs to the group managed by the group management device, for requesting authentication; an authentication assistant device for assisting in the authentication operation, a verification device for verifying that a user attempting authentication belongs to the group, and an authentication-subjected user identification device for identifying a user who is to be authenticated.

The authentication-subjected user device comprises an authentication assist request section for outputting an authentication assist request to request the authentication assistant device to perform an authentication assisting operation, and an unlinkable authentication data generation section for receiving authentication assist data from the authentication assistant device which has responded to the authentication assist request, and for generating unlinkable authentication data which does not enable anyone to determine whether authentications that are carried out a plurality of times are actions performed by the same user who is to be authenticated or by different users who are to be authenticated. The verification device comprises a verification section for receiving the unlinkable authentication data, and for performing verification. The authentication-subjected user identification device comprises an authentication-subjected user identification section for receiving the unlinkable authentication data and a secret key of the group, and for identifying a user who is to be authenticated.

According to still another aspect of the present invention, an anonymous authentication system comprises; a group management device for managing a group of users; an authentication-subjected user device for a member of the group to request authentication; a verification device for verifying that a user attempting authentication belongs to the group; an authentication assistant device for assisting in the authentication; a verification assistant device for assisting in the verification; and an authentication-subjected user identification device for identifying a user who is to be authenticated. The authentication-subjected user device comprises an authentication assist request section for outputting an authentication assist request to request the authentication assistant device to perform an authentication assisting operation, and an unlinkable authentication data generation section for receiving authentication assist data from the authentication assistant device which has responded to the authentication assist request, and for generating unlinkable authentication data which does not enable anyone to determine whether authentications that are carried out a plurality of times are actions performed by the same user who is to be authenticated or by different users who are to be authenticated. The verification device comprises a verification assist request section for outputting a verification assist request to request the verification assistant device to perform a verification assisting operation, and a verification section for receiving verification assist data from the verification assistant device that has responded to the verification assist request, for receiving the unlinkable authentication data, and for outputting the result of the verification. The authentication-subjected user identification device comprises an authentication-subjected user identification section for receiving the unlinkable authentication data and a secret key of the group, and for identifying a user who is to be authenticated.

The present invention provides the following advantages.

First, a user can be prevented from remaining anonymous, when necessary, while ensuring the anonymity of users who are to be authenticated, and no one can determine whether authentications that are carried out a plurality of times are actions performed by the same user who is to be authenticated or by different users who are to be authenticated. As a result, the privacy can be protected for users who belong to the group.

Second, it is possible to prevent a group manager who is responsible for managing a group from acting disguised as a user. As a result, the group manager can be prevented from excessively charging users by fraudulent means, for example, in a service which charges users on a pay-as-you-go basis. Also, since authentication data of a certain user can be generated only by the user, the user can be prevented from denying that he/she took actions to be authenticated.

Third, it is possible to reduce the amount of effort/work which the user must do as part of the authentication process. As a result, the present invention can deal with a case in which a user has a device with few calculation resources.

DESCRIPTION OF REFERENCE NUMERALS

10 Group Management Device
20, 21 Authentication-Subjected User Devices
30, 31 Verification Devices
40, 42 Verification Assistant Devices
50 Authentication-Subjected User Identification Device
61, 62 Authentication Assistant Devices
10-1 Registration Processing Section
10-2 Member Registration Information Storage Device
20-1 Registration Request Section
20-2 ID/Key Pair Storage Device
20-3 Authentication Request Section
20-4 Signature Generation Section 20-5 Unlinkable Authentication Data Generation Section
30-1 Challenge Generation Section
30-2 Verification Assist Request Section
30-3 Verification Section
30-4 Unlinkable Authentication Data Storage Device
30-5 Authentication-Subjected User Identification Request Section
40-1 Authentication Data Decoding Section
40-2 Signature Verification Section
50-1 Authentication Data Decoding Section
50-2 Authentication-Subjected User Identification Section
101-105, 201-208 Steps
301-305, 401-409, 501-511 Steps

BEST MODE FOR CARRYING OUT THE INVENTION

Exemplary embodiments of the present invention will be described below in detail with reference to the drawings.

The present invention features using a public key encryption in order to provide anonymity for users who are to be authenticated in anonymous authentication. In the public key encryption, a user has a secret key and a public key corresponding to the secret key. When user A transmits a message to user B using the public key encryption, user A encrypts the message using a public key, which is released to the public by user B, and transmits the encrypted message to user B. Upon receipt of the encrypted message, user B decrypts the encrypted message using his or her own secret key to reconstruct the message.

The present invention further features using a digital signature for authentication in order to prevent spoofing of a group manager who could act disguised as an existing user. The signature relies on the public key cryptography. A signer has a signing key (secret key) and a verification key (public key) corresponding to the signing key. The signer generates a signature on a message using the signing key. A verifier can confirm that the signature was attached by the signer using a verification key that is open to the public by the signer. By using an encrypted text as authentication data, a verifier is not provided with information on the ID of a user who is to be authenticated if the verifier does not have a decryption key for use in decryption.

In the following description, $a^{b}$ represents a to the power of b, and $a\_b$ represents a appended with subscript b. Also, a concatenation of bits is represented by "||" (for example, when a=10 (in binary notation), and b=01, then a||b=1001).

First Exemplary Embodiment

Figure 1:
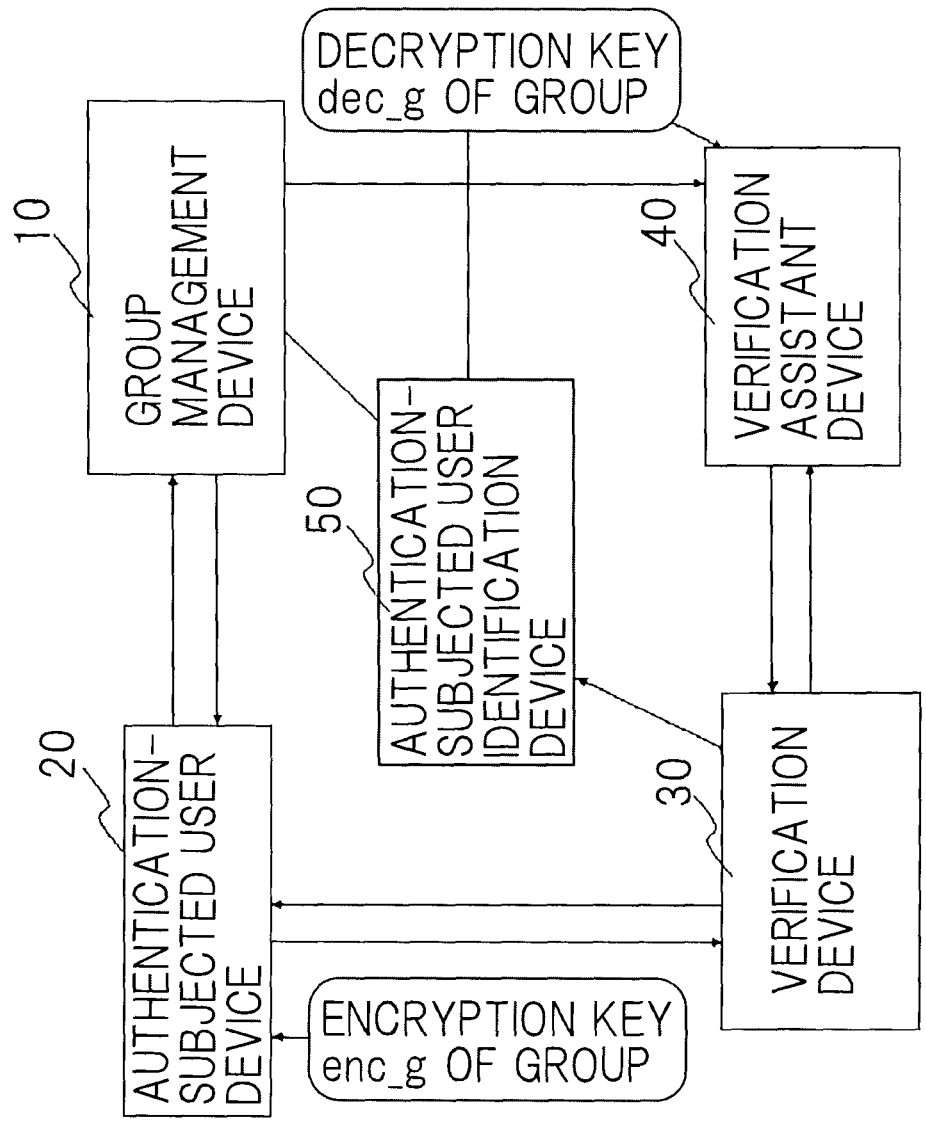
FIG. 1 is a block diagram of an anonymous authentication system according to a first exemplary embodiment of the present invention.

As shown in FIG. 1, an anonymous authentication system according to a first exemplary embodiment of the present invention comprises group management device 10, authentication-subjected user device 20, verification device 30, verification assistant device 40, and authentication-subjected user identification device 50. Group management device 10 manages a group of users. Authentication-subjected user device 20 is manipulated by a user who is to be authenticated and who belongs to the group managed by group management device 10 and requests authentication. Verification device 30 verifies that a user who is attempting authentication belongs to a group. Verification assistant device 40 assists in the verification operation. Authentication-subjected user identification device 50 prevents a user who is to be authenticated from remaining anonymous if some problem arises.

Group management device 10 and authentication-subjected user device 20; group management device 10 and verification assistant device 40; group management device 10 and authentication-subjected user identification device 50; authentication-subjected user device 20 and verification device 30; verification device 30 and verification assistant device 40; and verification device 40 and authentication-subjected user identification device 50 are connected to each other through a network such as the Internet.

Group management device 10 may be provided for each group, and a plurality of authentication-subjected user devices 20 and verification devices 30 may be provided for each group. Also, group encryption key enc_g that corresponds to a group is supplied to authentication-subjected user device 20. Group decryption key dec_g that corresponds to group encryption key enc_g is supplied to verification assistant device 40 and to authentication-subjected user identification device 50. These encryption key and decryption key exist for each group.

FIGS. 2 to 6 are block diagrams of group management device 10 through authentication-subjected user identification device 50, respectively.

Figure 2:
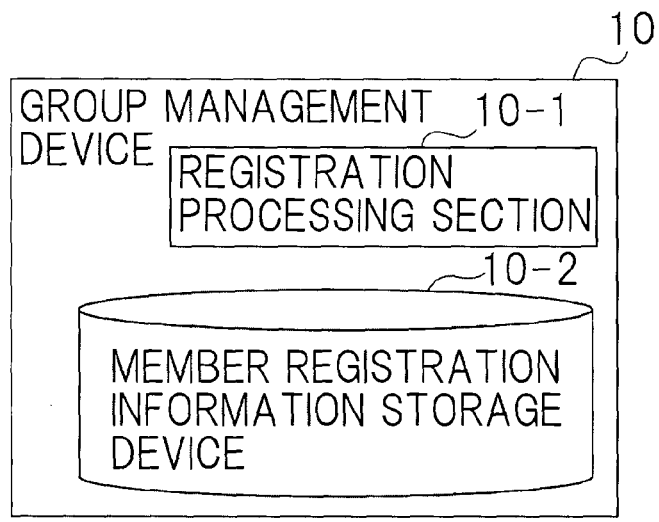
FIG. 2 is a block diagram of group management device 10.

As shown in FIG. 2, group management device 10 comprises registration processing section 10-1 for performing a registration process for a user to participate in the group, and member registration information storage device 10-2 for storing a registration information list (hereinafter referred to as "member list") of members who belong to the group.

Figure 3:
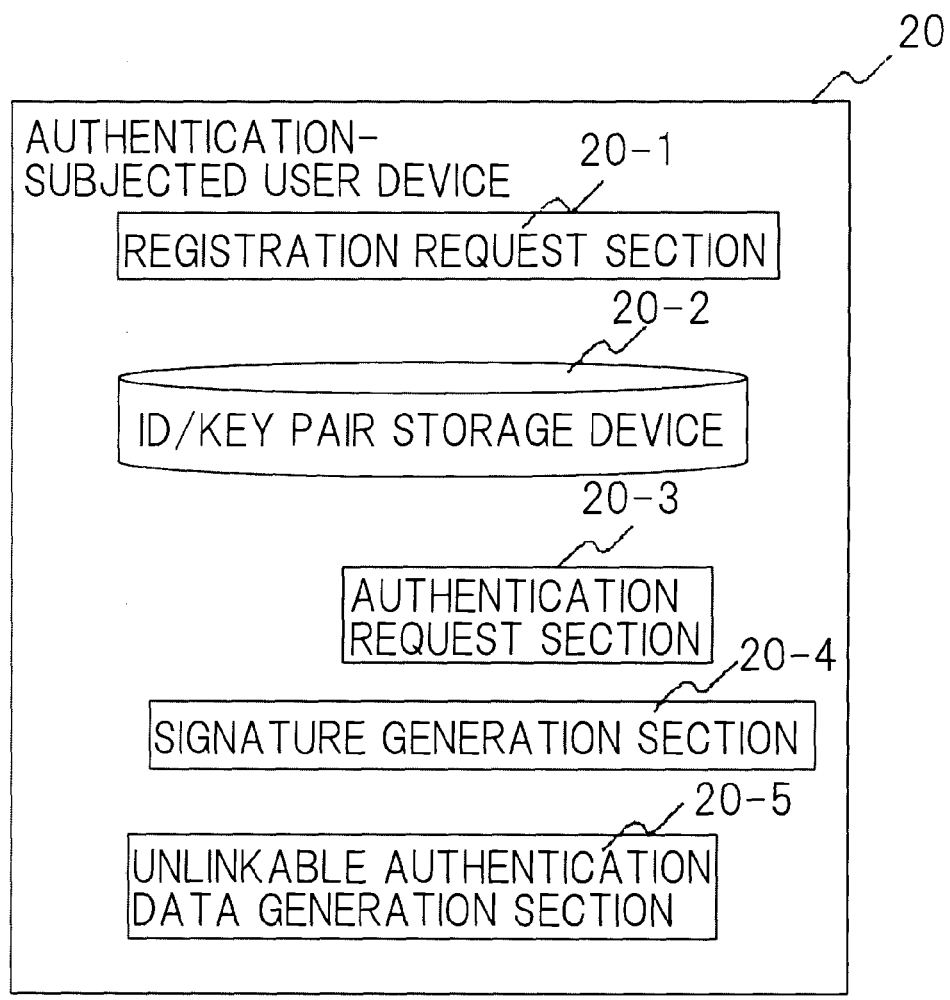
FIG. 3 is a block diagram of authentication-subjected user device 20.

As shown in FIG. 3, authentication-subjected user device 20 comprises registration request section 20-1 for transmitting a registration request message to group management device 10, and ID/key pair storage device 20-2 for storing a user's ID and a signing key/verification key pair of the user, which have been assigned by group management device 10. Authentication-subjected user device 20 further comprises authentication request section 20-3 for transmitting a request message which is to be authenticated by verification device 30; signature generation device 20-4 for generating a signature using the signing key of the user in the generation of authentication data; and unlinkable authentication data generation section 20-5 for receiving an encryption key of the group, and for generating unlinkable authentication data (unlinkable authentication data). Here, "unlinkable" signifies that no one can determine whether the operations of carrying out a plurality of times has been performed by the same user who is to be authenticated or by different users who are to be authenticated.

Figure 4:
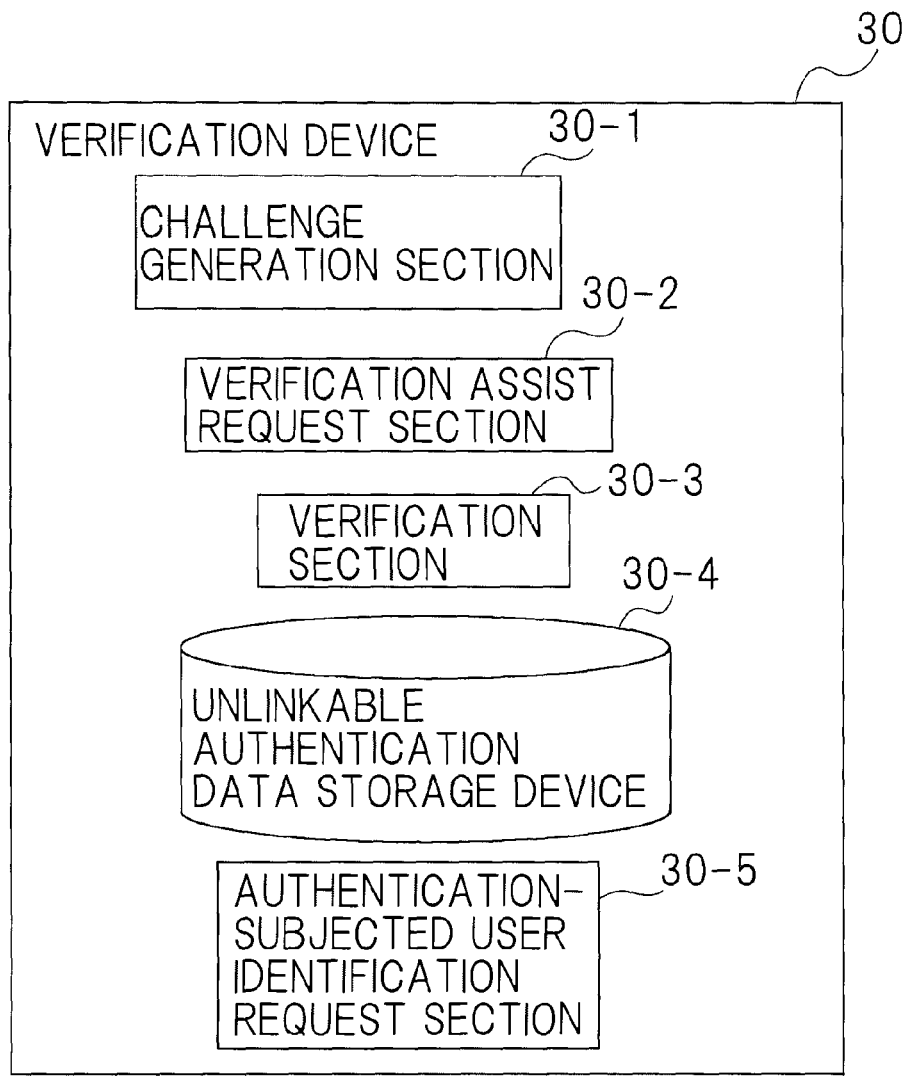
FIG. 4 is a block diagram of verification device 30.

As shown in FIG. 4, verification device 30 comprises challenge generation section 30-1 for receiving an authentication request, and for generating a challenge; verification assist request section 30-2 for receiving unlinkable authentication data, and for transmitting a verification assist request to verification assistant device 40; and verification section 30-3 for receiving a verification assist result, and for performing verification. Verification section 30 further comprises unlinkable authentication data storage device 30-4 for storing unlinkable authentication data as a history of authentication, and authentication-subjected user identification request section 30-5 for transmitting an anonymity deprivation request to authentication-subjected user identification device 50 for unlinkable authentication data stored in unlinkable authentication data storage device 30-4.

Figure 5:
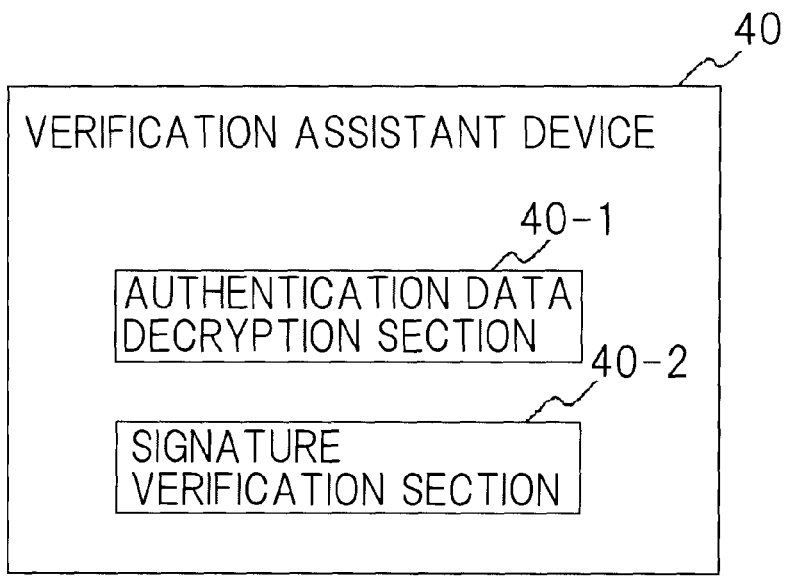
FIG. 5 is a block diagram of verification assistant device 40.

As shown in FIG. 5, verification assistant device 40 comprises authentication data decryption section 40-1 for receiving a verification assist request and a decryption key of the group, and for decrypting authentication data, and signature verification section 40-2 for receiving a member list, and for verifying a signature.

Figure 6:
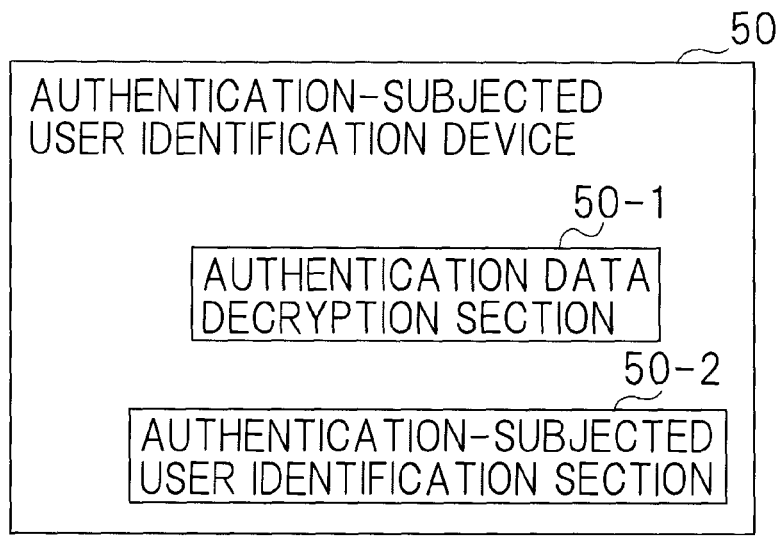
FIG. 6 is a block diagram of authentication-subjected user identification device 50.

As shown in FIG. 6, authentication-subjected user identification device 50 comprises authentication data decryption section 50-1 for receiving an anonymity deprivation request and the decryption key of the group, and for decrypting authentication data, and authentication-subjected user identification section 50-2 for receiving the member list, and for identifying a user who is to be authenticated.

Figure 7:
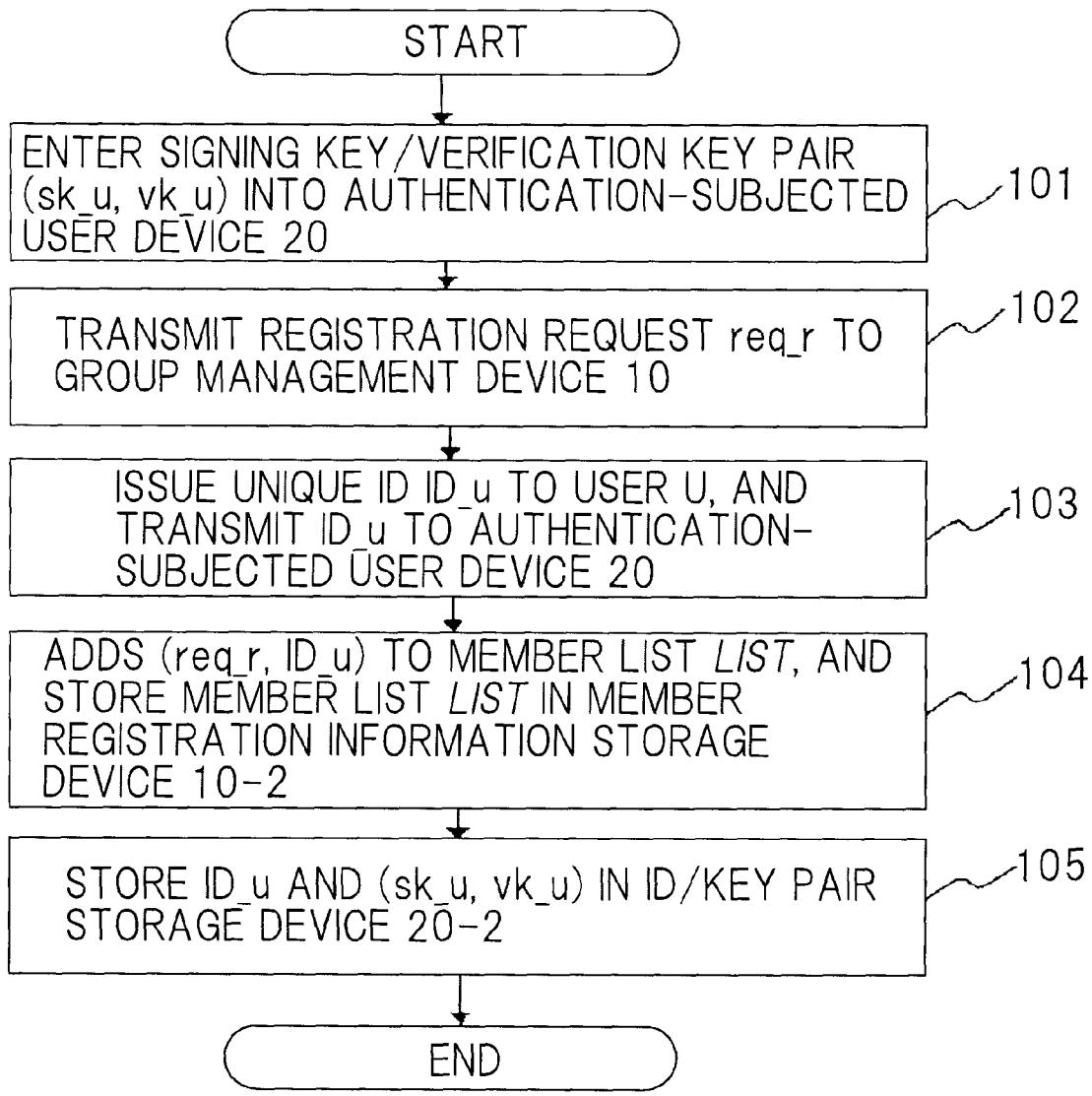
FIG. 7 is a flow chart of a sign-up registration process in the first exemplary embodiment.

First, a pre-authentication process (sign-up registration process) will be described with reference to FIG. 7.

An example is herein given for the case in which user U having signing key sk_u and verification key vk_u registers himself or herself. User U has previously stored the signing key/verification key pair (sk_u, vk_u) in an IC card, a flash memory or the like, and authentication-subjected user device 20 has an interface with which the user can access the IC card or the flash memory.

First, user U enters signing key/verification key pair (sk_u, vk_u) into authentication-subjected user device 20 (step 101). Upon receipt of verification key vk_u, registration request section 20-1 transmits registration request req_r to group management device 10 (step 102). At this time, registration request req_r includes verification key vk_u of user U, and personal information of user U such as address, name, age and the like, which are required for registration. Upon receipt of registration request req_r, registration processing section 10-1 issues unique ID ID_u for user U, and transmits ID_u to authentication-subjected user device 20 (step 103). However, if the registration entails some conditions (gender, age limit, double registration prohibition, and the like), registration processing section 10-1 makes an examination in accordance with registration request req_r, and may transmit an unacceptable registration to authentication-subjected user device 20 if the registration request is from user U who does not meet the conditions. If a user is not allowed to be registered, subsequent communications with the user are aborted. Registration processing section 10-1 reads member list List from member registration information storage device 10-2, adds (ID_u, req_r) to member list List, and stores updated member list List in member registration information storage device 10-2 (step 104). Authentication-subjected user device 20, which has received IDu, stores (ID_u, (sk_u, vk_u)) in ID/key pair storage device 20-2 (step 105).

Figure 8:
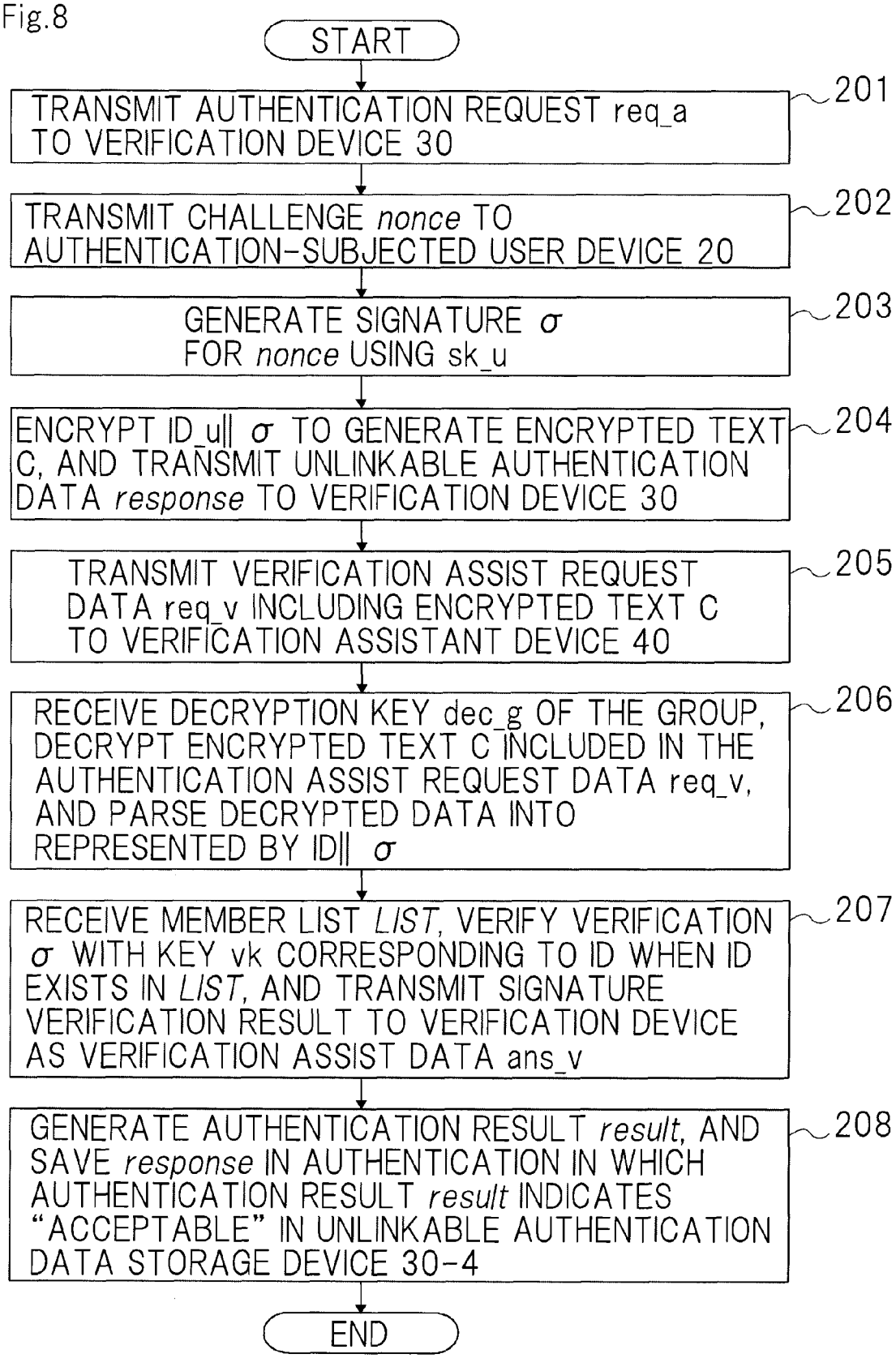
FIG. 8 is a flow chart of an authentication process in the first exemplary embodiment.

Next, the flow of an authentication process will be described with reference to FIG. 8.

An example is herein given for the description in which user U having signing key sk_u and verification key vk_u has completed the registration, and (IDu, (sk_u, vk_u)) has been stored in ID/key pair storage device 20-2.

First, authentication request section 20-3 in authentication-subjected user device 20 transmits authentication request req_a to verification device 30 (step 201). Challenge generation section 30-1, which has received authentication request req_a, transmits challenge nonce, which is a random message, to authentication-subjected user device 20 (step 202). Signature generation section 20-4, which has received a challenge nonce, generates signature σ of user U for a challenge nonce, using sk_u stored in ID/key pair storage device 20-2 (step 203). Next, unlinkable authentication data generation section 20-5, which has received encryption key enc_g of the group, encrypts ID_u∥σ to generate encrypted text C. Unlinkable authentication data generation section 20-5 further transmits an unlinkable authentication data response, including encrypted text C, to verification device 30 (step 204). Verification assist request section 30-2, which has received an unlinkable authentication data response, transmits verification assist request data req_v including encrypted text C to verification assistant device 40 (step 205). Verification data decryption section 40-1, which has received verification assist request data req_v and decryption key dec_g of the group, decrypts encrypted text C included in verification assist request data req_v, and parses decrypted data resulting from the decryption, into ID∥σ (step 206). In other words, the decrypted data is decomposed into ID and σ. Next, signature verification section 40-2, which has received member list List stored in member registration information storage device 10-2 in group management device 10, determines whether or not the ID is described in member list List. When it is not described, signature verification section 40-2 transmits verification assist data ans_v to verification device 30, indicating that the decrypted data is not acceptable. When it is described, signature verification section 40-2 verifies σ using verification key vk corresponding to the ID. The result of the signature verification (acceptable or not acceptable) is transmitted to verification device 30 as verification assist data ans_v (step 207). Verification section 30-3, which has received verification assist data ans_v, generates and outputs result which is the authentication result. Specifically, when verification assist data ans_v indicates "acceptable," authentication result result is data which means successful authentication. On the other hand, when verification assist data ans_v indicates "not acceptable," authentication result result is data which means unsuccessful authentication. Also, when verification assist data ans_v indicates "not acceptable," result which is the authentication result is data and which means unsuccessful authentication. Further, unlinkable authentication data response, which has resulted in successful authentication, is stored in unlinkable authentication data storage device 30-4 (step 208). However, the unlinkable authentication data, which has resulted in unsuccessful authentication, may also be stored in unlinkable authentication data storage device 30-4.

Since information related to the ID of authentication-subjected user device 20 is encrypted with encryption key enc_g of the group, verification device 30 is not provided with the information related to the ID of authentication-subjected user device 20, even with information as to whether two items of unlinkable authentication data were originated from the same user who is to be authenticated or from different users who are to be authenticated, because verification device 30 does not have decryption key dec_g of the group as an input. Verification assist device 40, which receives decryption key dec_g of the group as an input, decrypts encrypted text C included in verification assist request data req_v received from verification device 30, using decryption key dec_g of the group, to reconstruct the ID and signature data σ. Verification assistant device 40 confirms that signature data σ is accepted when the ID is included in member list List and when verification assistant device 40 verifies signature data σ using the verification key corresponding to the ID. Accordingly, a user who has not been registered, i.e., a user who does not have a signing key corresponding to a verification key included in member list List, cannot generate acceptable signature data using a verification key registered in member list List, and therefore cannot be successfully authenticated. Further, even a manager who manages the group does not know a signing key corresponding to a verification key registered in member list List, and therefore the user cannot be successfully authenticated.

Figure 9:
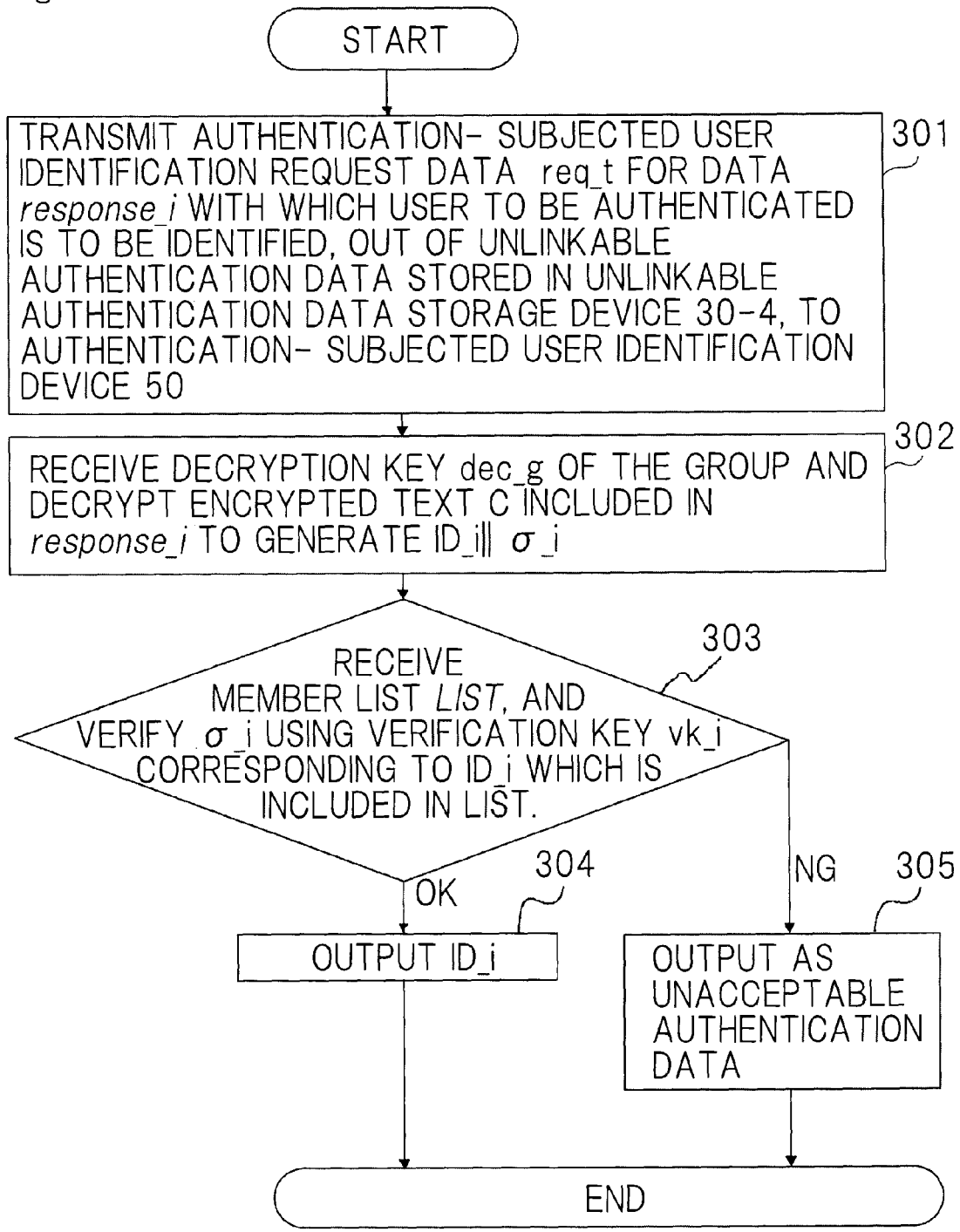
FIG. 9 is a flow chart of a process for identifying a user identification who is to be authenticated in the first exemplary embodiment.

Next, a process for identifying a user who is to be authenticated from unlinkable authentication data will be described with reference to FIG. 9.

An example is herein given for the case in which the anonymous authentication system identifies the ID of a user who is to be authenticated who has generated unlinkable authentication data response_i stored in unlinkable authentication data storage device 30-4 provided in verification device 30.

First, authentication-subjected user identification request section 30-5 of verification device 30, which has received unlinkable authentication data response_i stored in unlinkable authentication data storage device 30-4, transmits authentication-subjected user identification request data req_t to authentication-subjected user identification device 50 (step 301). Here, authentication-subjected user identification request data req_t includes unlinkable authentication data response_i. Authentication data decryption section 50-1, which has received authentication-subjected user identification request data req_t and decryption key dec_g of the group, decrypts encrypted text C_i included in unlinkable authentication data response_i, and parses the decrypted data into ID_i∥σ_i (step 302). Next, authentication-subjected user identification section 50-2, which has received member list List stored in member registration information storage device 10-2 provided in group management device 10, confirms that ID_i is described in member list List, and verifies σ_i using verification key vk_i corresponding to ID_i when ID_i is described in member list List (step 303). When the result of the verification indicates "acceptable," authentication-subjected user identification section 50-2 generates an output which indicates that unlinkable authentication data response_i is authentication data created by the user whose ID is ID_i (step 304). When ID_i is not described in member list List, or when the result of verifying σ_i indicates "not acceptable," authentication-subjected user identification section 50-2 generates an output which indicates that unlinkable authentication data response_i which has been transmitted to authentication-subjected user identification device 50 for requesting the same to identify a user who is to be authenticated is an unacceptable authentication data (step 305).

Additionally, the following configuration is possible as a modification to the first exemplary embodiment. Authentication-subjected user device 20 comprises at least unlinkable authentication data generation section 20-5 for generating unlinkable authentication data. Verification device 30 comprises at least verification assist request section 30-2 for outputting a verification assist request for requesting verification assistant device 40 to perform a verification assisting operation, and verification section 30-3 for receiving a verification assist data from verification assistant device 40 which has responded to the verification assist request, for receiving unlinkable authentication data from authentication-subjected user device 20, and for outputting a verification result. Authentication-subjected user identification device 50 comprises at least authentication-subjected user identification section 50-2 for receiving unlinkable authentication data and a secret key of a group and for identifying a user who is to be authenticated.

Second Exemplary Embodiment

Figure 10:
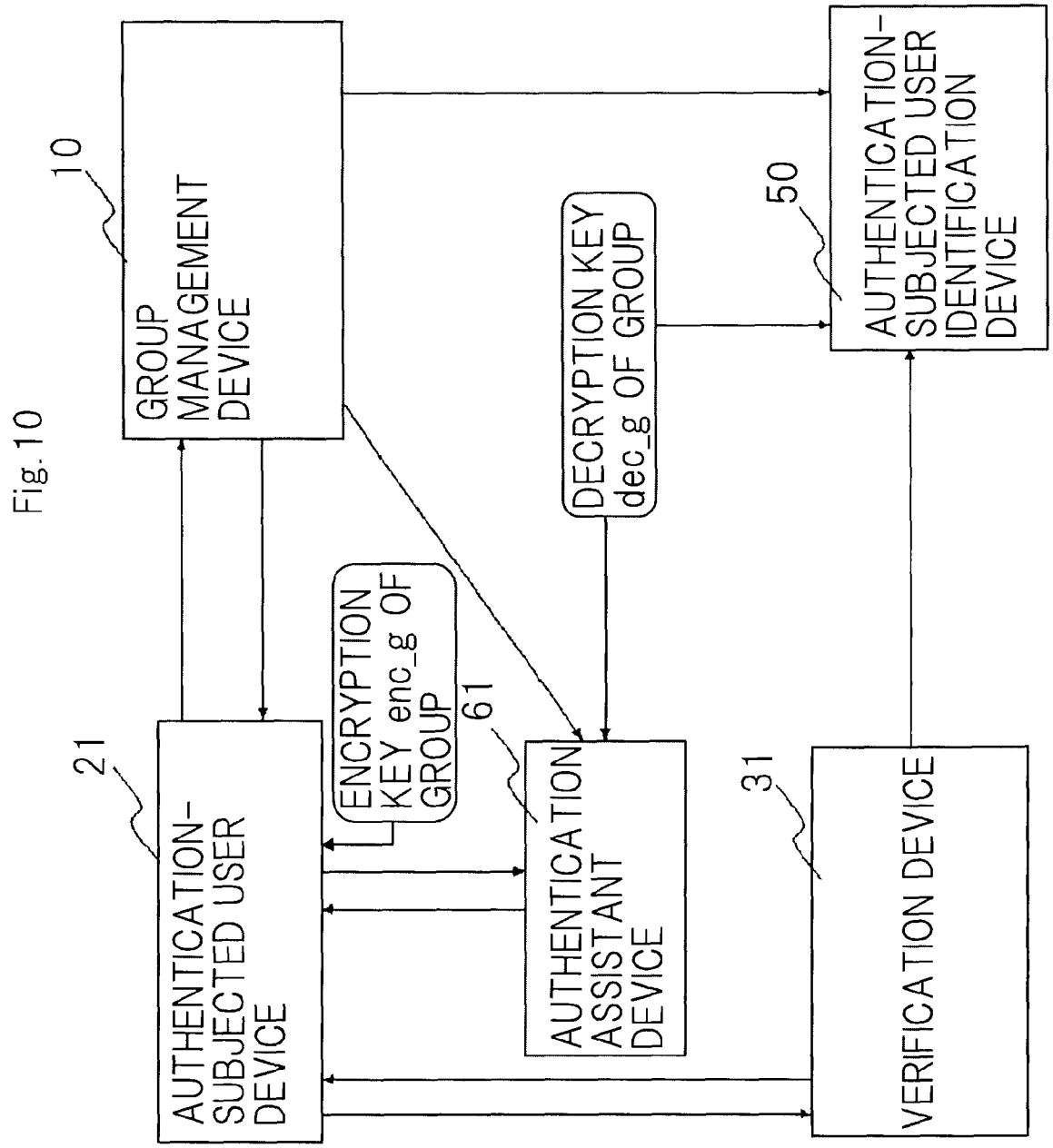
FIG. 10 is a block diagram of an anonymous authentication system according to a second exemplary embodiment of the present invention.

As shown in FIG. 10, an anonymous authentication system according to a second exemplary embodiment of the present invention comprises group management device 10, authentication-subjected user device 21, authentication assistant device 61, verification device 31, and authentication-subjected user identification device 50. Group management device 10 manages a group of users. Authentication-subjected user device 21 is manipulated by a user who is to be authenticated and who belongs to the group managed by group management device 10. Authentication assistant device 61 assists in the authentication data generating operation. Verification device 31 verifies that a user attempting authentication belongs to the group. Authentication-subjected user identification device 50 prevents a user, who is to be authenticated, from remaining anonymous if some problem arises.

Group management device 10 and authentication-subjected user device 21; group management device 10 and verification assistant device 41; group management device 10 and authentication-subjected user identification device 50; authentication-subjected user device 21 and verification device 31; authentication-subjected user device 21 and authentication assistant device 41; and verification device 41 and authentication-subjected user identification device 50 are connected to each other through a network such as the Internet.

Alternatively, when a plurality of groups exists, the group management device may exist for each group, and a plurality of authentication-subjected user devices and verification devices may exist for each group. Also, group encryption key enc_g corresponding to a group is input to authentication-subjected user device 21. Group decryption key dec_g corresponding to group encryption key enc_g is input to verification assistant device 61 and authentication-subjected user identification device 50. These encryption key and decryption key exist for each group.

Figure 11:
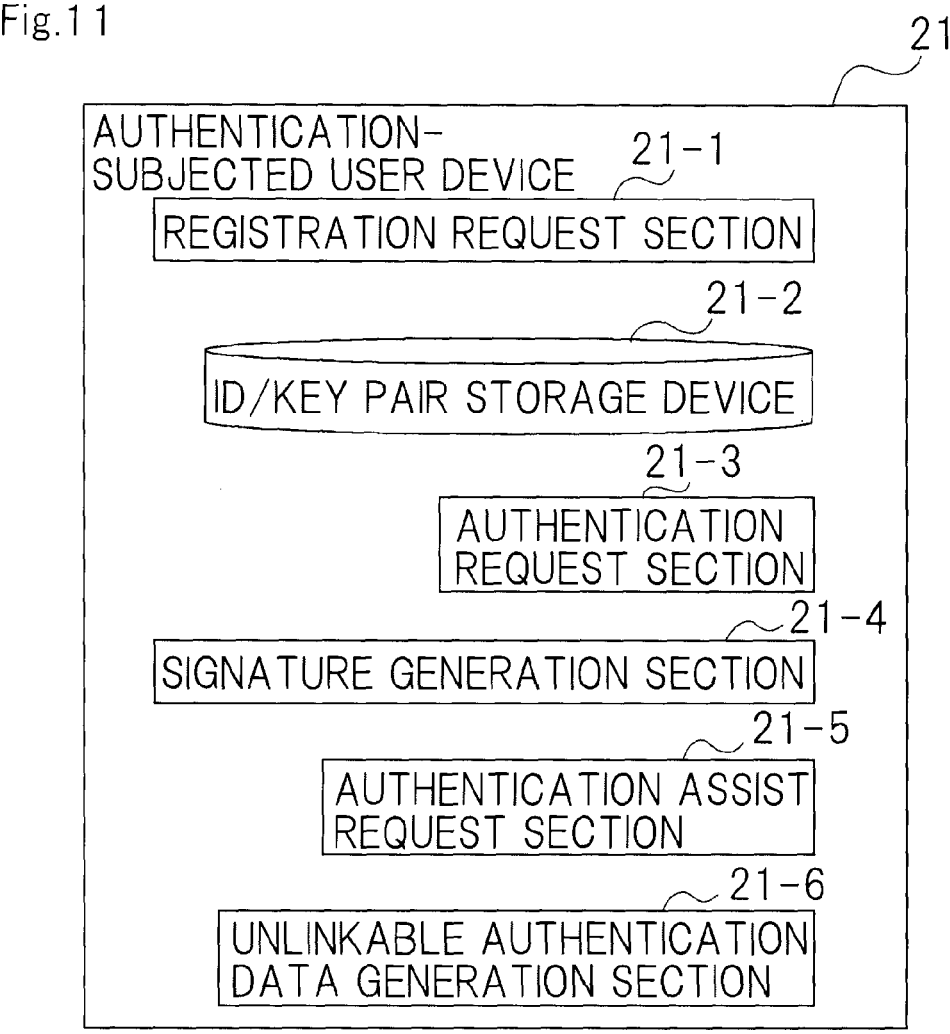
FIG. 11 is a block diagram of authentication-subjected user device 21.
Figure 12:
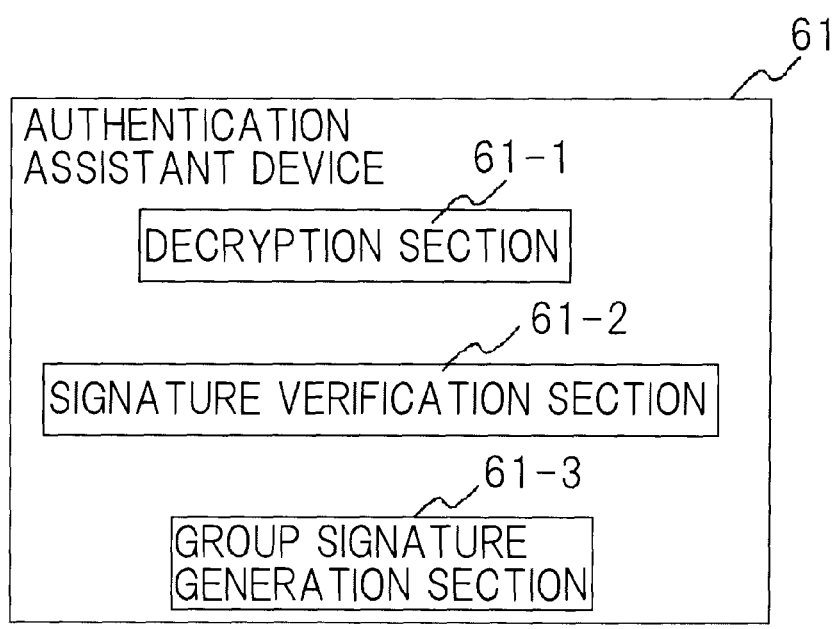
FIG. 12 is a block diagram of authentication assistant device 61.
Figure 13:
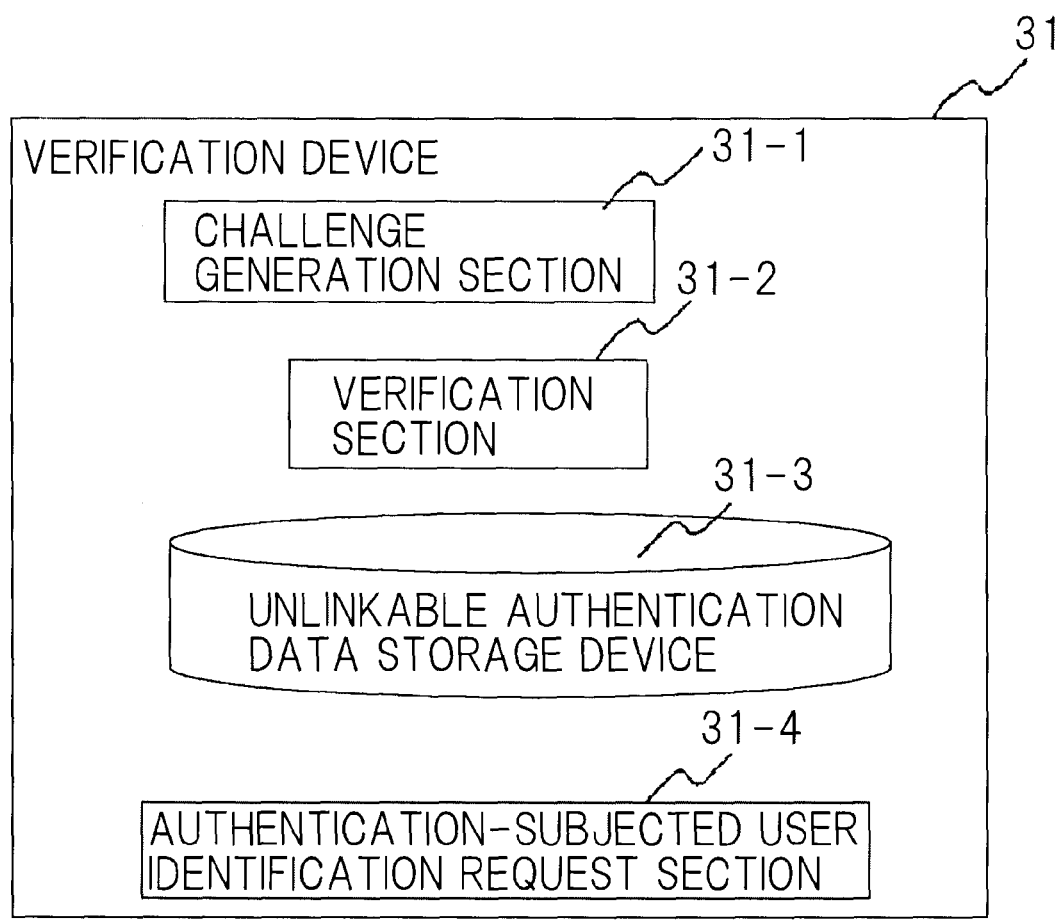
FIG. 13 is a block diagram of verification device 31.

FIG. 11 is a block diagram of authentication-subjected user device 21; FIG. 12 is a block diagram of authentication assistant device 61; and FIG. 13 is a block diagram of verification device 31. Since group management device 10 and authentication-subjected user identification device 50 are similar to those of the first embodiment, their illustrations are omitted.

As shown in FIG. 11, authentication-subjected user device 21 comprises registration request section 21-1 for transmitting a registration request message to group management device 10; ID/key pair storage device 21-2 for storing a user's ID and a signing key/verification key pair of the user, which have been assigned by group management device 10; and authentication request section 21-3 for transmitting a request message which is to be authenticated by verification device 31. Authentication-subjected user device 21 further comprises signature generation device 21-4 for generating a signature using the signing key of the user in the generation of authentication data; authentication assist request section 21-5 for receiving an encryption key of the group, for generating an encrypted text, and for transmitting authentication assist request data to authentication assistant device 61; and unlinkable authentication data generation section 21-6 for receiving authentication assist data, and for generating unlinkable authentication data.

As shown in FIG. 12, verification assistant device 61 comprises decryption section 61-1 for receiving a verification assist request and a decryption key of the group to decrypt an encrypted text; signature verification section 61-2 for receiving a member list, and for verifying a signature; and group signature generation section 61-3 for receiving the signing key of the group to attach a group signature to the encrypted text.

As shown in FIG. 13, verification device 31 comprises challenge generation section 31-1 for receiving an authentication request, and for generating a challenge, and verification section 31-2 for receiving unlinkable authentication data and the verification key of the group, and for performing verification. Verification device 31 further comprises unlinkable authentication data storage device 31-3 for storing unlinkable authentication data as a history of authentication, and authentication-subjected user identification request section 31-4 for transmitting an anonymity deprivation request to the authentication-subjected user identification device for unlinkable authentication data stored in unlinkable authentication data storage device 31-3.

Since a pre-authentication process (sign-up registration process) in this embodiment is similar to the pre-authentication process (sign-up registration process) of the first embodiment, the description thereof is omitted.

Figure 14:
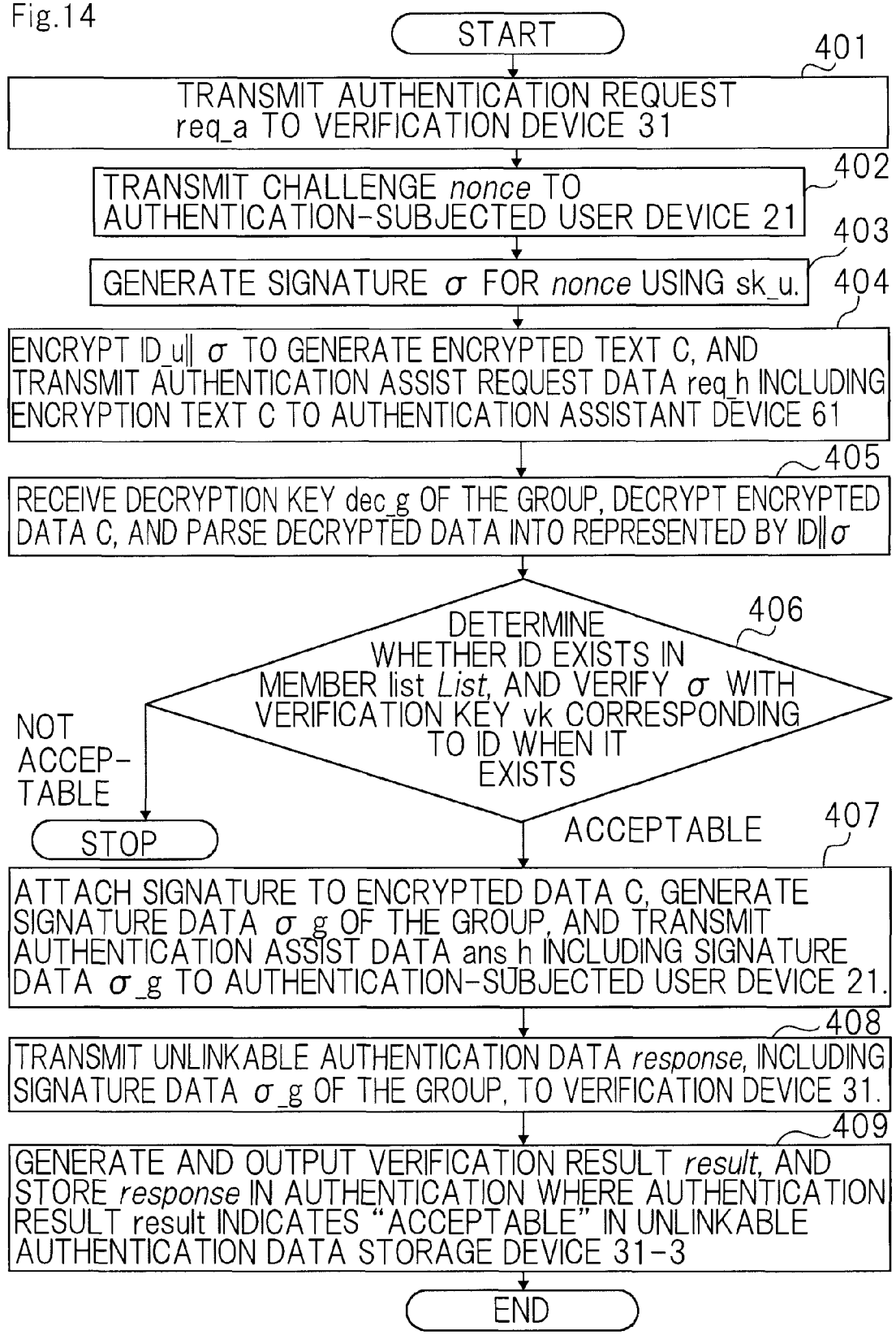
FIG. 14 is a sequence of an authentication process in the second exemplary embodiment.

Next, the flow of an authentication process will be described with reference to FIG. 14.

An example is given herein for the description on the assumption that user U having signing key sk_u and verification key vk_u has completed the registration, and (ID_u, (sk_u, vk_u)) has been stored in ID/key pair storage device 21-2.

First, authentication request section 21-3 in authentication-subjected user device 21 transmits authentication request req_a to verification device 31 (step 401). Challenge generation section 31-1, which has received authentication request req_a, generates a challenge nonce, which is a random message, transmits challenge nonce to authentication-subjected user device 21 (step 402). Signature generation section 21-4, which has received a challenge nonce, generates signature σ of user U for the challenge nonce, using sk_u stored in ID/key pair storage device 21-2 (step 403). Next, authentication assist request section 21-5, which has received encryption key enc_g of the group, encrypts ID_u∥σ to generate encrypted text C. Authentication assist request section 21-5 further transmits authentication assist request data req_h including encrypted text C to authentication assistant device 61 (step 404). Decryption section 61-1, which has received authentication assist request data req_h and decryption key dec_g of the group, decrypts encrypted text C included in authentication assist request data req_h, and parses the decrypted data into ID∥σ (step 405). Next, signature verification section 61-2, which has received member list List stored in member registration information storage device 10-2 of group management device 10, determines whether or not the ID is described in member list List. When the ID is described in member list List, signature verification section 61-2 verifies σ using verification key vk corresponding to the ID (step 406). When the ID is not described in member list List, or when the result of verifying a indicates "not acceptable," subsequent operations are aborted. When the ID is described in member list List, and σ is accepted using verification key vk corresponding to the ID, group signature generation section 61-3, which has received signing key sk_g of the group, attaches a signature to encrypted text C using signing key sk_g of the group to generate signature σ_g. Signature generation section 61-3 further transmits authentication assist data ans_h including signature σ_g to authentication-subjected user device 21 (step 407). Unlinkable authentication data generation section 21-6, which has received authentication assist data ans_h, transmits unlinkable authentication data response which includes signature σ_g included in authentication assist data ans_h to verification device 31 (step 408). Verification section 31-2, which has received an unlinkable authentication data response and verification key vk_g of the group, verifies signature σ_g included in the unlinkable authentication data response. When the result of the verification indicates "acceptable," result (authentication result) is output to indicate that the authentication is successful. Further, unlinkable authentication data response is stored in unlinkable authentication data storage device 31-3. On the other hand, when the result of the verification indicates "not acceptable," result (authentication result) is output to indicate that the authentication is unsuccessful (step 409). However, unlinkable authentication data, which has resulted in unsuccessful authentication, may also be stored in unlinkable authentication data storage device 31-3. Since the process for identifying a user who is to be authenticated from the unlinkable authentication data is similar to that in the first embodiment, the description thereof is omitted.

Additionally, the following configuration is possible as a modification to the second exemplary embodiment. Authentication-subjected user device 21 comprises at least authentication assist request section 21-5 for receiving the encryption key of the group, for generating an encrypted text, and for transmitting authentication assist request data to authentication assistant device 61, and unlinkable authentication data generation section 21-6 for receiving authentication assist data from authentication assistant device 61, and for generating unlinkable authentication data. Verification device 31 comprises at least verification section 31-2 for receiving the unlinkable authentication data and the verification key of the group, and for performing verification. Authentication-subjected user identification device 50 comprises at least authentication-subjected user identification section 50-2 for receiving the unlinkable authentication data and the secret key of the group, and for identifying a user who is to be authenticated.

Third Exemplary Embodiment

Figure 15:
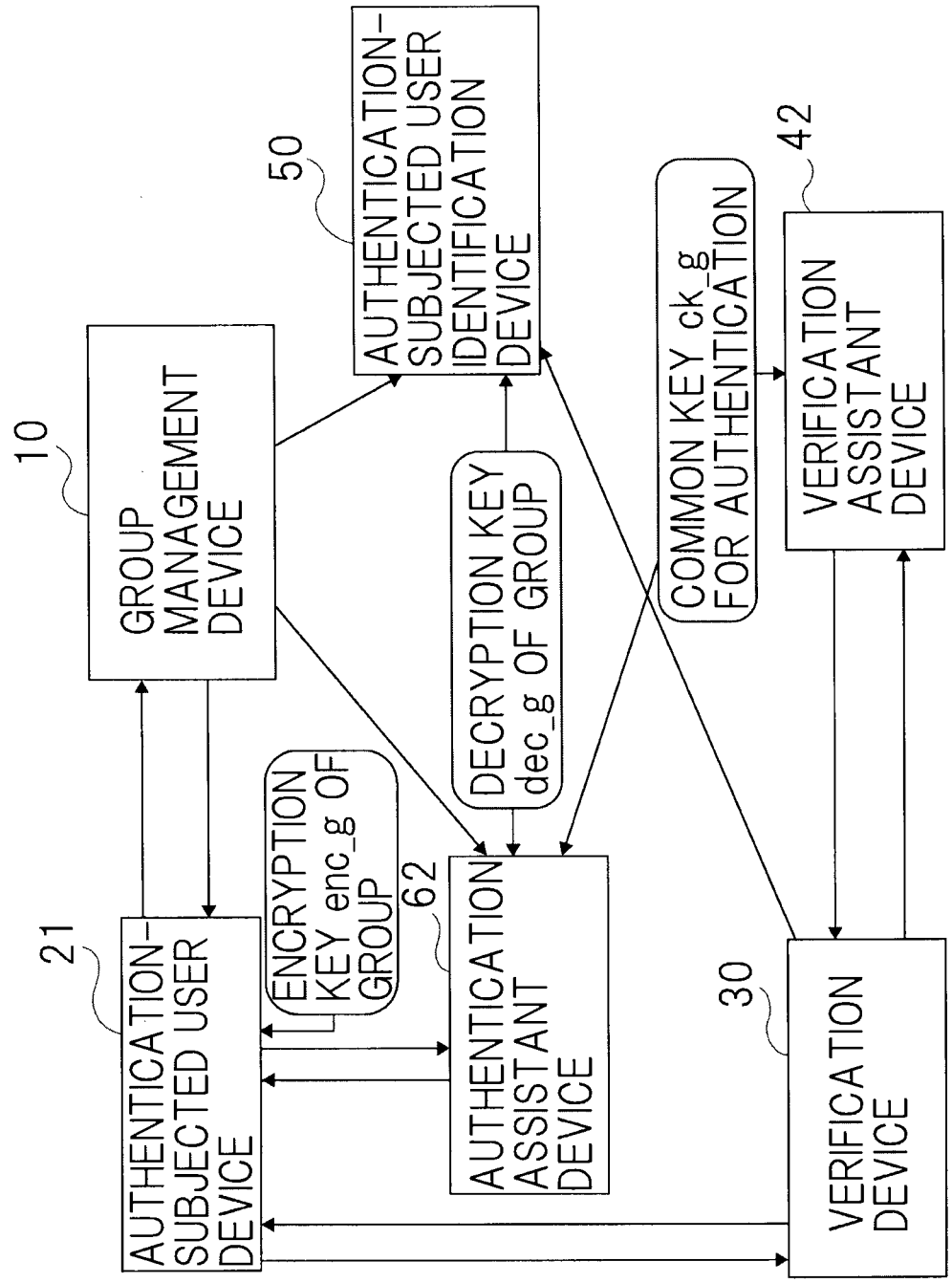
FIG. 15 is a block diagram of an anonymous authentication system according to a third exemplary embodiment of the present invention.

As shown in FIG. 15, an anonymous authentication system according to a third exemplary embodiment of the present invention comprises group management device 10, authentication-subjected user device 21, authentication assistant device 62, verification device 30, verification assistant device 42, and authentication-subjected user identification device 50. Group management device 10 manages a group of users. Authentication-subjected user device 21 is manipulated by a user who is to be authenticated and who belongs to the group managed by group management device 10. Authentication assistant device 62 assists in the authentication data generating operation. Verification device 30 verifies that a user attempting authentication belongs to the group. Verification assistant device 42 assists in the verifying operation. Authentication-subjected user identification device 50 prevents a user, who is to be authenticated, from remaining anonymous if some problem arises.

Group management device 10 and authentication-subjected user device 21; group management device 10 and verification assistant device 42; group management device 10 and authentication-subjected user identification device 50; authentication-subjected user device 21 and verification device 30; authentication-subjected user device 21 and authentication assistant device 62; verification device 30 and verification assistant device 42; and verification device 42 and authentication-subjected user identification device 50 are connected to each other through a network such as the Internet.

Alternatively, when a plurality of groups exists, the group management device may exist for each group, and a plurality of authentication-subjected user devices and verification devices may exist for each group. Also, group encryption key enc_g corresponding to a group is input to authentication-subjected user device 22. Group decryption key dec_g corresponding to group encryption key enc_g is input to authentication assistant device 62 and authentication-subjected user identification device 52. These encryption key and decryption key exist for each group. Further, common key ck_g for authentication is input to authentication assistant device 62 and verification assistant device 42.

Figure 16:
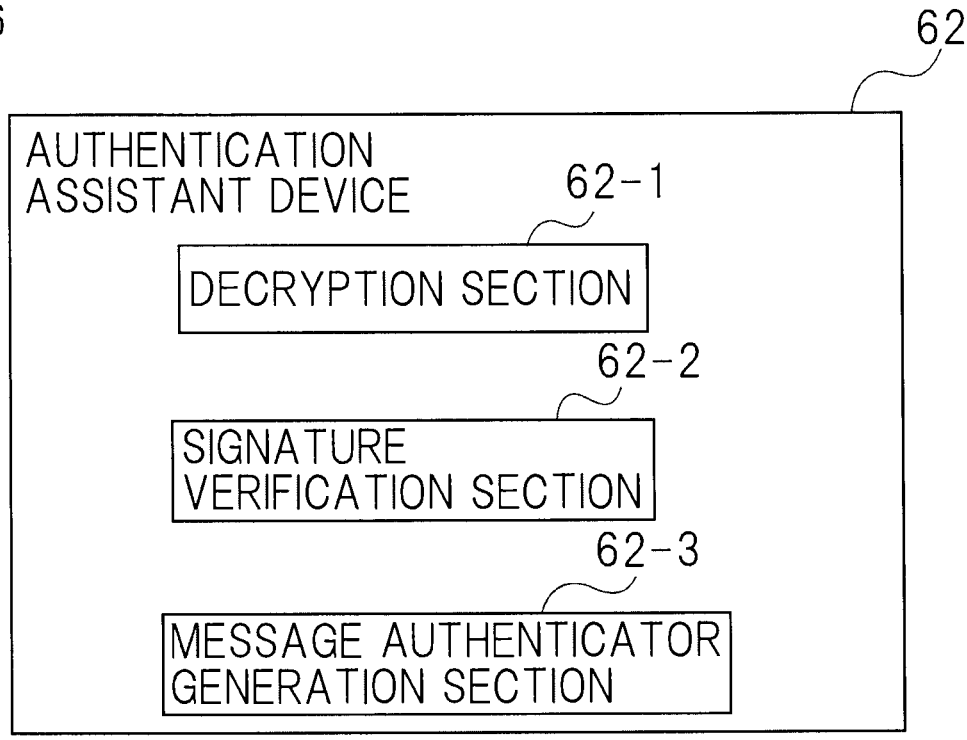
FIG. 16 is a block diagram of authentication assistant device 62.
Figure 17:
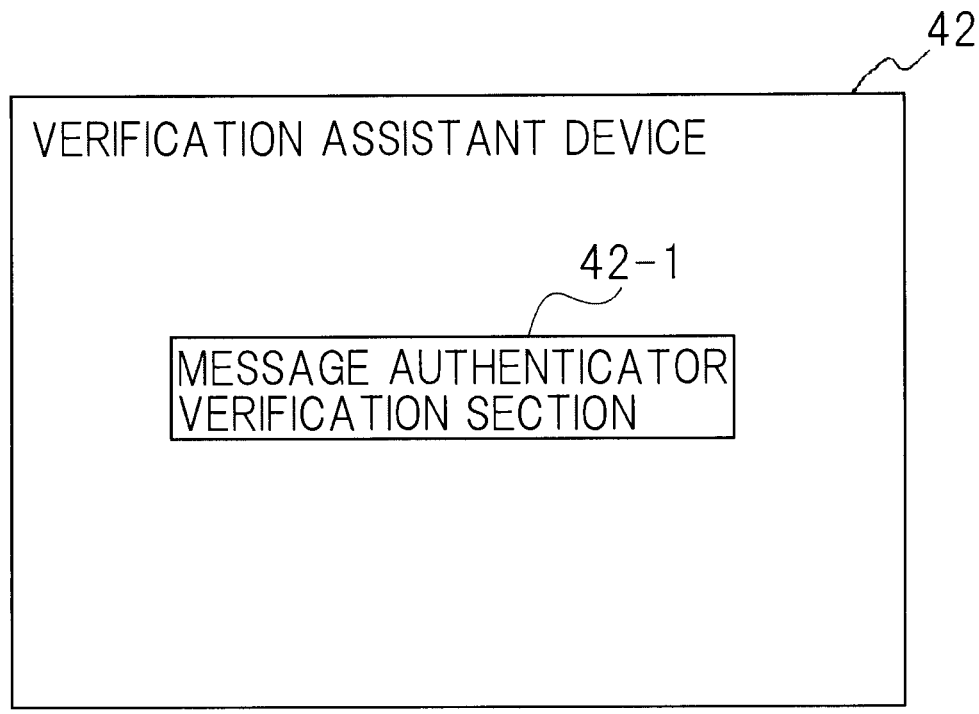
FIG. 17 is a block diagram of authentication assistant device 42.

FIG. 16 is a block diagram of authentication assistant device 62, and FIG. 17 is a block diagram of verification assistant device 42. Since group management device 10, verification device 30, and authentication-subjected user identification device 50 are similar to those of the first embodiment, their illustrations are omitted. Also, since authentication-subjected user device 21 is similar to that of the second embodiment, its illustration is omitted.

As shown in FIG. 16, authentication assistant device 62 comprises decryption section 62-1 for receiving an authentication assist request and the decryption key of the group, and for decrypting an encrypted text; signature verification section 62-2 for receiving a member list, and for verifying a signature; and message authenticator generation section 62-3 for receiving a common key for authentication to attach a message authenticator to an encrypted text.

As shown in FIG. 17, verification assistant device 42 comprises message authenticator verification section 42-1 for receiving a verification assist request, and for verifying a message authenticator attached to an encrypted text included in the verification assist request.

Since a pre-authentication process (sign-up registration process) in this embodiment is similar to the pre-authentication process (sign-up registration process) of the first embodiment, the description thereof is omitted.

Figure 18:
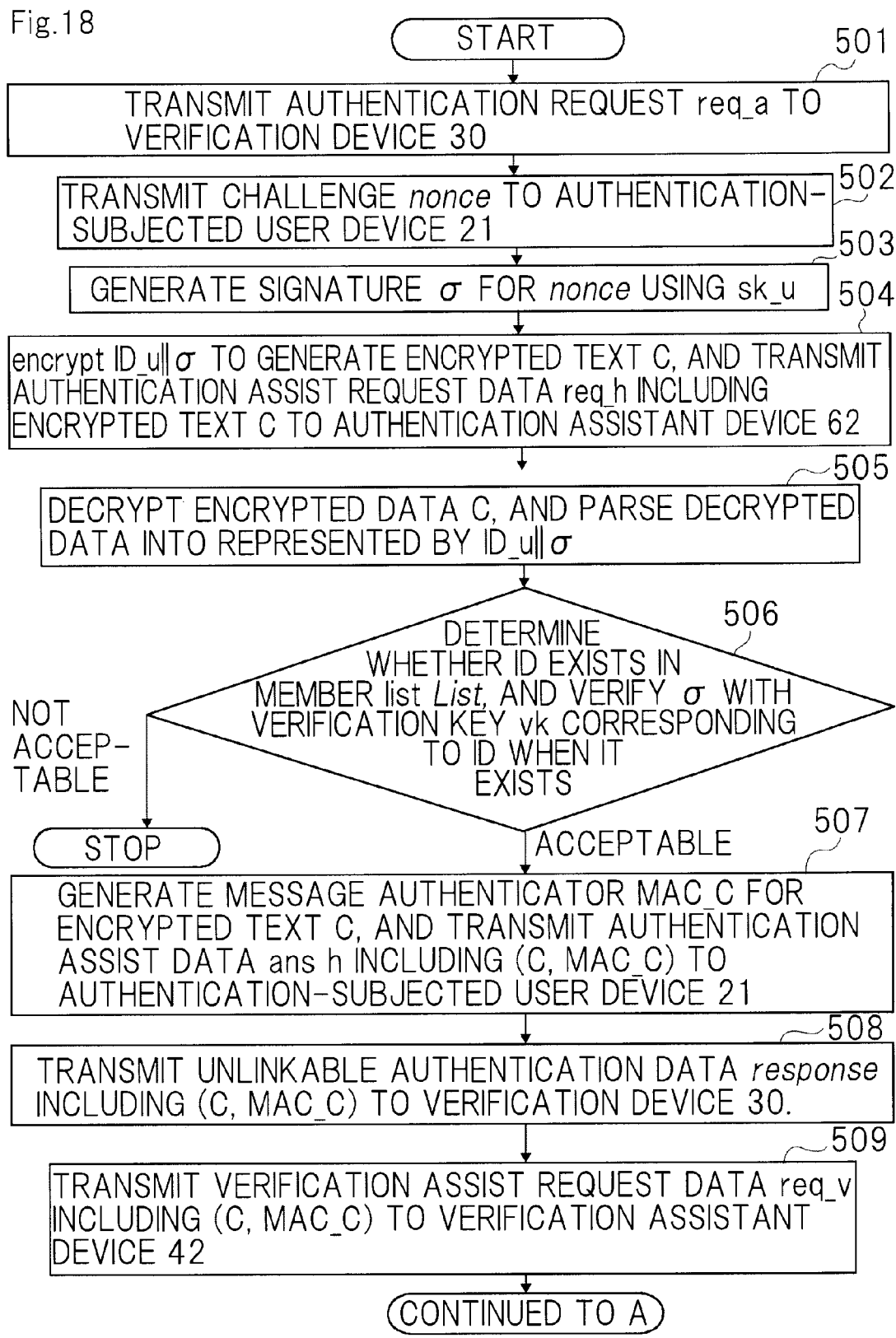
FIG. 18 is a flow chart of an authentication process in the third exemplary embodiment.
Figure 19:
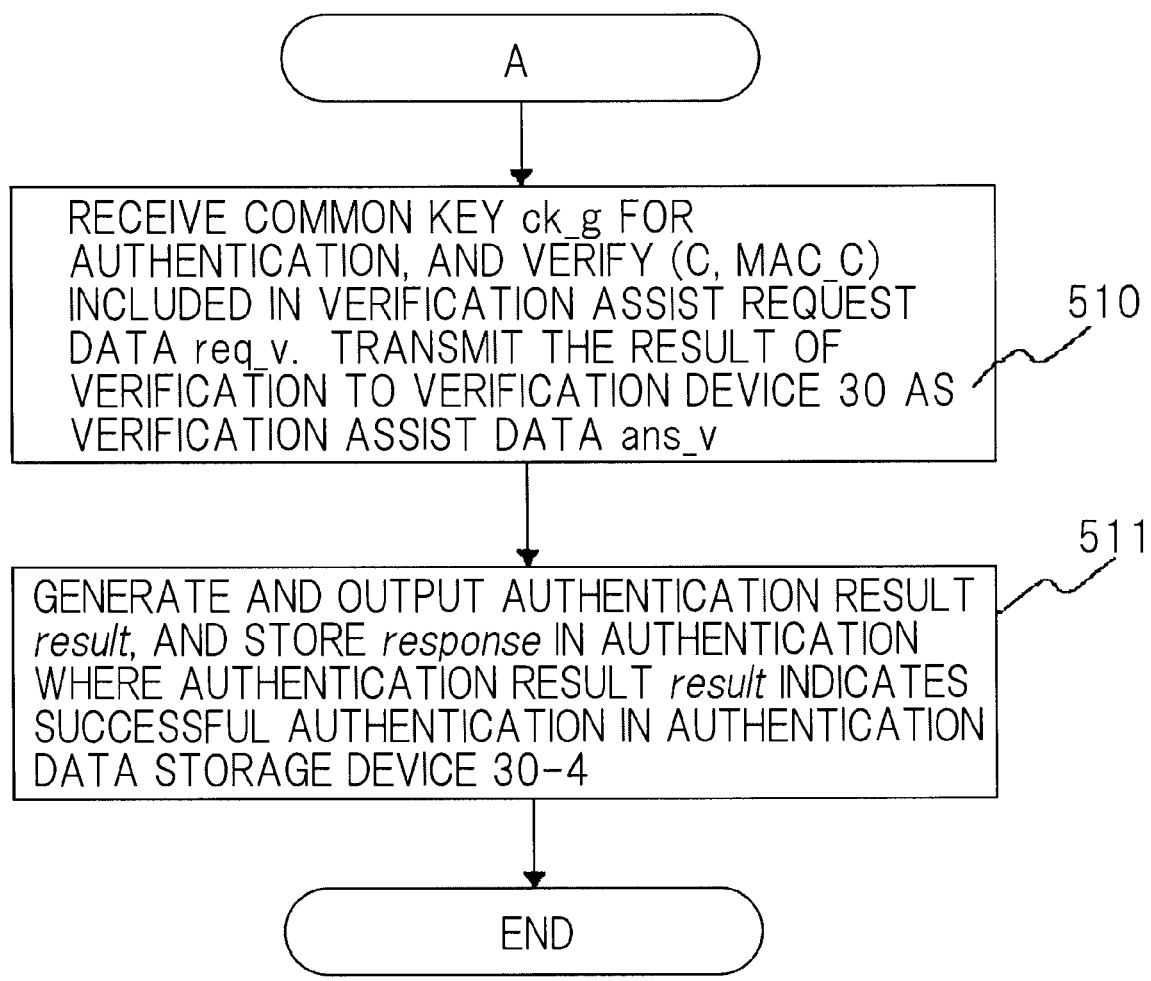
FIG. 19 is a flow chart of the authentication process in the third exemplary embodiment.

Next, the flow of an authentication process will be described with reference to FIGS. 18, 19. An example is given herein for the description on the assumption that user U having signing key sk_u and verification key vk_u has completed the registration, and (ID_u, (sk_u, vk_u)) has been stored in ID/key pair storage device 21-2.

First, authentication request section 21-3 in authentication-subjected user device 21 transmits authentication request req_a to verification device 30 (step 501). Challenge generation section 31-1, which has received authentication request req_a, transmits a challenge nonce, which is a random message, to authentication-subjected user device 21 (step 502). Signature generation section 21-4, which has received a challenge nonce, generates signature σ of user U for the challenge nonce, using sk_u stored in ID/key pair storage device 21-2 (step 503). Next, authentication assist request section 21-5, which has received encryption key enc_g of the group, encrypts ID_u||σ to generate encrypted text C. Authentication assist request section 21-5 further transmits authentication assist request data req_h including encrypted text C to authentication assistant device 62 (step 504). Decryption section 62-1, which has received verification assist request data req_h and decryption key dec_g of the group, decrypts encrypted text C included in verification assist request data req_h, and parses the decrypted data into ID||σ (step 505). Next, signature verification section 62-2, which has received member list List stored in member registration information storage device 10-2 of group management device 10, determines whether or not the ID is described in member list List. When the ID is described in member list List, signature verification section 62-2 verifies σ using verification key vk corresponding to the ID (step 506). When the ID is not described in member list List, or when the result of verifying a indicates "not acceptable," subsequent operations are aborted. When the ID is described in member list List, and σ is accepted using verification key vk corresponding to the ID, message authenticator generation section 62-3, which has received common key ck_g for authentication, generates message authenticator MAC_C for encrypted text C. Message authenticator generation section 62-3 further transmits authentication assist data ans_h including (C, MAC_C) to authentication-subjected user device 21 (step 507). Unlinkable authentication data generation section 21-6, which has received authentication assist data ans_h, transmits an unlinkable authentication data response including (C, MAC_C) included in authentication assist data ans_h to verification device 30 (step 508). Verification assist request section 30-2, which has the received unlinkable authentication data response, transmits verification assist request data req_v including (C, MAC_C) included in the unlinkable authentication data response to verification assistant device 42 (step 509). Message authenticator verification section 42-1, which has received verification assist request data req_v and common key ck_g for authentication, verifies (C, MAC_C) included in verification assist request data req_v. Message authenticator verification section 42-1 transmits the result of the verification (acceptable or not acceptable) to verification device 30 as verification assist data ans_v (step 510). Verification section 30-3, which has received verification assist data ans_v, generates and outputs result (authentication result). In this event, when verification assist data ans_v indicates "acceptable," result (verification result) indicates successful authentication, whereas when verification assist data ans_v indicates "not acceptable," result (verification result) indicates unsuccessful authentication. Further, the unlinkable authentication data response, which has resulted in successful authentication, is stored in unlinkable authentication data storage device 30-4 (step 511). However, unlinkable authentication data, which has resulted in unsuccessful authentication, may also be stored in unlinkable authentication data storage device 30-4. Since a process for identifying a user who is to be authenticated from the unlinkable authentication data is similar to that in the first embodiment, the description thereof is omitted.

Additionally, the following configuration is possible as a modification to the third exemplary embodiment. Authentication-subjected user device 21 comprises at least authentication assist request section 21-5 for receiving the encryption key of the group, for generating an encrypted text, and for transmitting authentication assist request data to authentication assistant device 61, and unlinkable authentication data generation section 21-6 for receiving authentication assist data from authentication assistant device 61, and for generating unlinkable authentication data. Verification device 30 comprises at least verification assist request section 30-2 for outputting a verification assist request for requesting verification assistant device 40 to perform a verification assisting operation, and verification section 30-3 for receiving verification assist data from verification assistant device 40 which has responded to the verification assist request, and for receiving the unlinkable authentication data from authentication-subjected user device 20, and for outputting a verification result. Authentication-subjected user identification device 50 comprises at least authentication-subjected user identification section 50-2 for receiving the unlinkable authentication data and the secret key of the group, and for identifying a user who is to be authenticated.

Specific Example 1

This specific example presents an example in which the anonymous authentication system according to the first embodiment is implemented using a public key encryption scheme and an electronic signature scheme.

A public key encryption scheme for use by the present invention may include, for example, a public key encryption scheme (hereinafter referred to as "Cramer-Shoup encryption scheme") described in an article: R. Cramer and V. Shoup.

"Design and Analysis of Practical Public-Key Encryption Schemes Secure against Adaptive Chosen Ciphertext Attack," In Advances in Cryptology-Crypto '98, pp. 13-25, 1998 (Reference 1). Further, an electronic signature scheme for use by the present invention may include an electronic signature scheme (hereinafter referred to as "Cramer-Shoup signature scheme) described in an article: R. Cramer and V. Shoup, "Signature Schemes Based on the Strong RSA Assumption," ACM Transoperations on Information and System SEcurity (ACM TISSEC), 3(3), pp. 161-185, 2000 (Reference 2). Also, in the present invention, another public key encryption scheme may be used, not limited to the Cramer-Shoup encryption scheme described in Reference 1 as long as it is a public key encryption scheme which can mathematically prove that the encryption scheme is secure such that any information related to a message can not leak from an encrypted text, for example, an RSA-OAEP encryption scheme or the like. The RSA-OAEP encryption scheme is a public key encryption scheme based on a unique factorization problem, which is a combination of an RSA encryption scheme described in an article: R. Rivest, A. Shamir and L. Adleman, "A Method for Obtaining Digital Signatures and Public-Key," Cryptosystems. Communications of the ACM, 21(2), pp. 120-126, 1879 (Reference 3), and Optimal Asymmetric Encryption Padding (OAEP) described in an article: M. Bellare and P. Rogaway, "Optimal Asymmetric Encryption—How to Encrypt with RSA," in Advance in Cryptology-Eurocrypt, '94, pp. 92-111, Springer-Verlag, 1994 (Reference 4). Likewise, not limited to the Cramer-Shoup signature scheme described in Reference 2, another electronic signature scheme may be used, for example, a Fiat-Shamir signature scheme or the like, as long as it is an electronic signature scheme which can mathematically prove that the signature scheme is a secure scheme such that signature data received with a certain verification key cannot be generated unless one knows a signing key corresponding to the verification key. The Fiat-Shamir signature scheme is a signature scheme described in an article: Fiat, A., and Shamir, "How to prove yourself: Practical Solutions to identification and signature problems," Proceedings of CRYPTO '86, LNCS 263, pp. 186-197, Springer-Verlag, 1987 (Reference 5), and is an electronic signature scheme which can prove that the scheme is a secure scheme by assuming the existence of an ideal hash function that is referred to as random oracle, and further by employing a mathematical assumption, i.e., a unique factorization assumption.

First, a description will be given of the Cramer-Shoup encryption scheme. The Cramer-Shoup encryption scheme is a public key encryption scheme which can prove that the scheme is a secure scheme by employing a mathematical assumption that is referred to as a DDH assumption. The Cramer-Shoup cryptography is comprised of three components, i.e., key set-up, encryption process, and decryption process.

Assume herein for purposes of description an example in which Bob transmits a message to Alice First described is the key set-up. Alice generates cyclic group G with order q, and selects at random two different generators $g\_1, g\_2$. Alice further selects at random six values $x\_1, x\_2, y\_1, y\_2, z\_1, z\_2$ from a residual group which has prime number q as a divisor (hereinafter represented by $Z\_\{q\}$). Next, Alice calculates $c=g\_1^\{x\_1\} \cdot g\_2^\{x\_2\}$, $d=g\_1^\{y\_1\} \cdot g\_2^\{y\_2\}$, and $h=g\_1^\{z\_1\} \cdot g\_2^\{z\_2\}$. Alice also selects hash function H which has a collision-resistant property. Hash function H is a hash function from three elements of G to $Z\_\{q\}$. In this event, Alice has an encryption key $(G, g\_1, g\_2, (c,d,h), H)$. Also, Alice has a decryption key $(x\_1, x\_2, y\_1, y\_2, z\_1, z\_2)$. Alice had opened the encryption key to the public, and Bob has received Alice's encryption key.

Next described is the encryption process. Assume herein that Bob encrypts and transmits elements m of cyclic group G to Alice as a message. Bob selects random value k from $Z\_\{q\}$. Bob further calculates $u\_1=g\_1^\{k\}$, $u\_2=g\_2^\{k\}$, $e=h^\{k\} \cdot m$, $\alpha=H(u\_1, u\_2, e)$, and $v=c^\{k\}d^\{k \cdot \alpha\}$. Bob transmits $(u\_1, u\_2, e, v)$ to Alice as an encrypted text.

Next described is the decryption process. Alice calculates $\alpha=H(u\_1, u\_2, e)$ and confirms that $v=u\_1^\{x\_1+\alpha \cdot y\_1\} \cdot u\_2^\{x\_2+\alpha \cdot y\_2\}$ is established. If the equation is not established, subsequent processing is aborted on the assumption that an undecryptable encrypted text is sent. When the equation is established, Alice calculates $m=e/(u\_1^\{z\_1\} \cdot u\_2^\{z\_2\})$ to reconstruct message m.

Next described is the Cramer-Shoup signature. The Cramer-Shoup signature scheme is a digital signature scheme which can prove that the signature scheme is a secure system by employing a mathematical assumption that is referred to as a strong RSA assumption. The Cramer-Shoup signature is comprised of three components, i.e., key set-up, signature generation process, and signature verification process.

First described is the key set-up. Two different security parameters k, k' are selected, and k-bit prime numbers p, q are selected at random. Note that prime numbers p, q are selected such that $p=2p'+1$ and $q=2q'+1$ are satisfied where p' and q' are prime numbers. Next, $n=p \cdot q$ is calculated. Subsequently, QR(n) represents a set of a which satisfies $x^\{2\} \equiv a \pmod n$ where n is divisor. Next, two random elements h, x are selected from QR(n). Further, (k'+1)-bit prime number e' is selected. Also, collision-resistance hash function H' is selected. Hash function H' is a hash function for the conversion from a set of binary series having an arbitrary length to a set of binary series having a bit length of k'+1. In this event, a verification key is ((n,h,x,e'), H') which has been open to the public. A signing key corresponding to the verification key is (p,q).

Next described is the signature generation process. Assume herein that a signature is attached to message m. A signer first calculates H'(m). The signer next selects at random a (k'+1)-bit prime number e which is different from e', and element y' of QR(n), and calculates x' which satisfies $y'^\{e'\}=x' \cdot h^\{H'(m)\}$ mod n. Similarly, the signer calculates y which satisfies $y^\{e\}=x \cdot h^\{H'(x')\}$ mod n. Signature data is determined to be (e, y, y').

Next described is the signature verification process. A verifier first confirms that e is a (k'+1)-bit prime number which is different from e'. Next, the verifier calculates $x'=(y')^\{e'\} \cdot h^\{-H'(m)\}$, and confirms that $x=y^\{e\} \cdot h^\{-H'(x')\}$ is established. When the equation is established, "acceptable" is output, while when the equation is not established, "not acceptable" is output.

Next, operations for implementing the present invention will be described in connection with a specific example. This specific example implements the anonymous authentication system according to the first embodiment using the Cramer-Shoup encryption scheme and Cramer-Shoup signature scheme. Assume herein that, by way of example, encryption key enc_g=$(G, g\_1, g\_2, (c\_g, d\_g, h\_g), H\_g)$ of the Cramer-Shoup encryption has been opened to the public as encryption key enc_g of a group. Also, corresponding decryption key dec_g is dec_g=$(x\_\{g,1\}, x\_\{g,2\}, y\_\{g,1\}, y\_\{g,2\}, z\_\{g,1\}, z\_\{g,2\})$. Further, in the following description to be given, user U who attempts to participate in the group has signing key sk_u=(p_u, q_u) of the Cramer-Shoup signature, and corresponding verification key vk_u=((n_u, h_u, x_u, e'_u), H'_u).

First, a pre-authentication process (sign-up registration process) will be described. User U enters signing key/verification key pair (sk_u, vk_u) into authentication-subjected user device 20. Registration request section 20-1, which has received verification key vk_u, transmits registration request req_r to group management device 10. In this event, registration request req_r includes verification key vk_u of user U, and personal information of user U such as address, name, age and the like, which are required for registration. Registration processing section 10-1, which has received registration request req_r, issues unique ID ID_u for user U, and transmits ID_u to authentication-subjected user device 20. However, if the registration entails some conditions (gender, age limit, double registration prohibited, and the like), registration processing section 10-1 makes an examination in accordance with registration request req_r, and may transmit an unacceptable registration to authentication-subjected user device 20 if the registration request is from user U who does not meet the conditions. If a user is not allowed to be registered, subsequent communications with the user are aborted. Group management device 10 receives member list List from member registration information storage device 10-2, additionally writes (ID_u, req_r) to member list List, and stores updated member list List in member registration information storage device 10-2. Authentication-subjected user device 20, which has received ID_u, stores (ID_u, (sk_u, vk_u)) in ID/key pair storage device 20-2.

Next, the flow of an authentication process will be described. An example is given herein for the description on the assumption that user U having signing key sk_u and verification key vk_u has completed the registration, and (IDu, (sk_u, vk_u)) has been stored in ID/key pair storage device 20-2.

First, authentication request section 20-3 of authentication-subjected user device 20 transmits authentication request req_a to verification device 30. Authentication request req_a may be a fixed text defined by the system. Challenge generation section 30-1, which has received authentication request req_a, selects a nonce at random, and transmits a nonce to authentication-subjected user device 20. Signature generation section 20-4, which has received a challenge nonce, calculates H'u(nonce) using sk_u stored in ID/key pair storage device 20-2. Next, signature generation section 20-4 selects at random (k'+1)-bit prime number e which is different from e' u and element y' of QR(n_u), and calculates x'_u which satisfies $y'^{e'u}=x' \cdot h_u^{H'_u(nonce)}$ mod n_u. Similarly, signature generation section 20-4 calculates y which satisfies $y\_u^{e}=x \cdot u \cdot h\_u^{H'\_u(x')}$ mod n_u. Assume that signature data is σ=(e,y,y'). Next, unlinkable authentication data generation section 20-5, which has received encryption key enc_g=(G, g_1, g_2, (c_g, d_g, h_g), H_g) of the group, selects random value k from Z_{q}. Unlinkable authentication data generation section 20-5 further calculates $u\_1=g\_1^{k}$, $u\_2=g\_2^{k}$, $e=h\_g^{k} \cdot (ID\_u \| \sigma)$, α=H_g(u_1, u_2, e), and $v=c\_g^{k}d\_g^{k \cdot \alpha}$. Assume that encrypted text C is (u_1, u_2, e, v). Unlinkable authentication data generation section 20-5 further transmits an unlinkable authentication data response=(nonce, C) to verification device 30.

Verification assist request section 30-2, which has received an unlinkable authentication data response, transmits verification assist request data req_v=response, including encrypted text C, to verification assistant device 40. Verification data decryption section 40-1, which has received verification assist request data req_v and decryption key dec_g=(x_{g,1}, x_{g,2}, y_{g,1}, y_{g,2}, z_{g,1}), z_{g,2} of the group, calculates α=H_g(u_1, u_2, e) from encrypted text C=(u_1, u_2, e, v) included in verification assist request data req_v, and confirms that $v=u\_1^{\{x\_{g,1}+\alpha \cdot y\_{g,1}\}} \cdot u\_2^{\{x\_{g,2}+\alpha \cdot y\_{g,2}\}}$ is established. If the equation is not established, subsequent processing is aborted on the assumption that an undecryptable encrypted text has been sent. When the equation is established, authentication data decryption section 40-1 calculates $m=e/(u\_1^{\{z\_{g,1}\}} \cdot u\_2^{\{z\_{g,2}\}})$ to reconstruct message m. Authentication data decryption section 40-1 further parses the resulting message m into ID∥σ. In other words, m is decomposed into ID and σ=(e,y,y').

Next, signature verification section 40-2, which has received member list List stored in member registration information storage device 10-2 of group management device 10, determines whether or not the ID is described in member list List. When the ID is not described, signature verification section 40-2 transmits verification assist data ans_v to verification device 30, indicating that the decrypted data is not acceptable. When the ID is described, signature verification section 40-2 first confirms that e is a (k'+1)-bit prime number which is different from e', using verification key vk=((n,h,x, e'), H') corresponding to the ID. Next, signature verification section 40-2 calculates $x'(y')^{\{e'\}} \cdot h^{\{-H'(nonce)\}}$, and confirms that $x=(y)^{\{e\}} \cdot h^{\{-H'(x)\}}$ is established. When the equation is established, the signature is determined as accepted, whereas when the equation is not established, the signature is determined as not accepted. The result of the signature verification (acceptable or not acceptable) is transmitted to verification device 30 as verification assist data ans_v. Verification section 30-3, which has received verification assist data ans_v, outputs result (authentication result) as successful authentication when verification assist data ans_v indicates "acceptable." When verification assist data ans_v indicates "not acceptable," verification section 30-3 outputs result (authentication result) as unsuccessful authentication when verification assist data ans_v indicates "not acceptable." Further, an unlinkable authentication data response, which has resulted in successful authentication, is stored in unlinkable authentication data storage device 30-4. However, unlinkable authentication data, which has resulted in unsuccessful authentication, may also be stored in unlinkable authentication data storage device 30-4.

Next, a process for identifying a user who is to be authenticated from unlinkable authentication data will be described. An example is given herein in a scenario where the anonymous authentication system identifies the ID of a user who is to be authenticated and who has generated unlinkable authentication data response_i stored in unlinkable authentication data storage device 30-4 provided in verification device 30.

First, authentication-subjected user identification request section 30-5 of verification device 30, which has received unlinkable authentication data response_i=(nonce_i, C_i) stored in unlinkable authentication data storage device 30-4, transmits authentication-subjected user identification request data req_t=response_i to authentication-subjected user device 50. Authentication data decryption section 50-1, which has received authentication-subjected user identification request data req_t and decryption key dec_g=(x_{g,1}, x_{g,2}, y_{g,1}, y_{g,2}, z_{g,1}, z_{g,2}) of the group, calculates αH_g(u_{i,1}, u_{i,2}, e_i) from encrypted text C=_i(u_{i,1}, u_{i,2}, e_i, v_i) included in authentication-subjected user identification request data req_t, and confirms that $v=u\_{i,1}^{\{x\_{g,1}+\alpha \cdot y\_{g,1}\}} \cdot u\_{i,2}^{x\_{g,2}+\alpha \cdot y\_{g,2}}$ is established. When the equation is not established, subsequent processing is aborted on the assumption that an undecryptable encrypted text has been sent. When the equation is established, authentication data decryption section 50-1 calculates $m\_i = e\_i/(u\_{i,1}^{\{z\_{g,1}\}} \cdot u\_{i,2}^{\{z\_{g,2}\}})$ to reconstruct message m_i. Authentication data decryption section 50-1 further parses the resulting message m_i into ID_i||σ_i. In other words, m_i is decomposed into ID_i and σ_i=(e_i, y_i, y'_i). Next, authentication-subjected user identification section 50-2, which has received member list List stored in member registration information storage device 10-2 provided in group management device 10, confirms that ID_i is described in member list List. When ID_i is described in member list List, authentication-subjected user identification section 50-2 confirms that e_i is a (k'+1)-bit prime number which is different from e'_i, using verification key vk_i=((n_i, h_i, x_i, e'_i), H'_i) corresponding to the ID_i. Next, authentication-subjected user identification section 50-2 calculates $x'\_i = (y'\_i)^{\{e'\_i\}} \cdot h\_i^{\{-H'\_i(nonce\_i)\}}$, and confirms that $x\_i = (y\_i)^{\{e\_i\}} \cdot h\_i^{\{-H'\_i(x'\_i)\}}$ is established. When the equation is established, the signature is determined as accepted, whereas when the equation is not established, the signature is determined as not accepted. When the result of the verification indicates "acceptable," authentication-subjected user identification section 50-2 generates an output which indicates that unlinkable authentication data response_i is authentication data created by the user whose ID is ID_i. When ID_i is not described in member list List, or when the result of verifying σ_i indicates "not acceptable," authentication-subjected user identification section 50-2 generates an output which indicates that unlinkable authentication data response_i which has been transmitted to authentication-subjected user identification device 50 for requesting the same to identify a user who is to be authenticated is unacceptable authentication data.

Specific Example 2

This specific example presents a specific example in which the anonymous authentication system according to the second embodiment is implemented using the Cramer-Shoup encryption scheme and the Cramer-Shoup signature scheme.

Assume herein that, by way of example, encryption key enc_g=(G, g_1, g_2, (c_g, d_g, h_g), H_g) of the Cramer-Shoup encryption has been opened to the public as encryption key enc_g of a group. Assume also that corresponding decryption key dec_g is dec_g=(x_{g,1}, x_{g,2}, y_{g,1}, y_{g,2}, z_{g,1}, z_{g,2}). Assume that as signing key sk_g of the group, the system comprises signing key sk_g=(p_g, q_g) of the Cramer-Shoup signature, and corresponding verification key vk_g=((n_g, h_g, x_g, e'_g), H'_g). Further, in the following description to be given, user U who attempts to participate in the group has signing key sk_u=(p_u, q_u) of the Cramer-Shoup signature, and corresponding verification key vk_u=((n_u, h_u, x_u, e'_u), H'_u).

Since a pre-authentication process (sign-up registration process) in this specific example is similar to the pre-authentication process (sign-up registration process) of the first specific example, the description thereof is omitted.

Next, the flow of an authentication process will be described.

First, authentication request section 21-3 of authentication-subjected user device 20 transmits authentication request req_a to verification device 31. Authentication request req_a may be a fixed text defined by the system. Challenge generation section 31-1, which has received authentication request req_a, selects a nonce at random, and transmits the nonce to authentication-subjected user device 21. Signature generation section 21-4, which has received a challenge nonce, first calculates H'_u(nonce) using sk_u stored in ID/key pair storage device 21-2. Next, signature generation section 21-4 selects at random (k'+1)-bit prime number e which is different from e'_u and element y' of QR(n_u), and calculates x'_u which satisfies $y'^{\{e'\_u\}} = x' \cdot h\_u^{\{H'\_u(nonce)\}} \bmod n\_u$. Similarly, signature generation section 21-4 calculates y which satisfies $y\_u^{\{e\}} = x\_u \cdot h\_u^{\{H'\_u(x')\}} \bmod n\_u$. Assume that signature data is σ=(e,y,y'). Next, authentication assist request section 21-5, which has received encryption key enc_g=(G, g_1, g_2, (c_g, d_g, h_g), H_g) of the group, selects random value k from Z_{q}. Authentication assist request section 21-5 further calculates $u\_1 = g\_1^{\{k\}}$, $u\_2 = g\_2^{\{k\}}$, $e = h\_g^{\{k\}} \cdot (ID\_u||σ)$, $α = H\_g(u\_1, u\_2, e)$, and $v = c\_g^{\{k\}} d\_g^{\{k \cdot α\}}$. Assume that encrypted text C is (u_1, u_2, e, v). Authentication assist request section 21-5 further transmits authentication assist request data req_h=(nonce, C) to authentication assistant device 61.

Decryption section 61-1, which has received authentication assist request data req_h and decryption key dec_g=(x_{g,1}, x_{g,2}, y_{g,1}, y_{g,2}, z_{g,1}, z_{g,2}) of the group, calculates α=H_g(u_1, u_2, e) from encrypted text C included in authentication assist request data req_h, and confirms that $v = u\_1^{\{x\_{g,1}+α \cdot y\_{g,1}\}} \cdot u\_2^{\{x\_{\{g,2\}}+α \cdot y\_{\{g,2\}}\}}$ is established. If the equation is not established, subsequent processing is aborted on the assumption that an undecryptable encrypted text has been sent. When the equation is established, decryption section 61-1 calculates $m = e/(u\_1^{\{z\_{g,1}\}} \cdot u\_2^{\{z\_{g,2}\}})$ to reconstruct message m. Decryption section 61-1 further parses the resulting message m into ID||σ. In other words, m is decomposed into ID and σ=(e,y,y').

Next, signature verification section 61-2, which has received member list List stored in member registration information storage device 10-2 of group management device 10, determines whether or not the ID is described in member list List. When the ID is described in member list List, signature verification section 61-2 first confirms that e is a (k'+1)-bit prime number which is different from e', using verification key vk corresponding to the ID. Next, signature verification section 61-2 calculates $x' = (y')^{\{e'\}} \cdot h^{\{-H'(nonce)\}}$, and confirms that $x = (y)^{\{e\}} \cdot h^{\{-H(x')\}}$ is established. When the equation is established, the signature is determined as accepted, whereas when the equation is not established, the signature is determined as not accepted. When the ID is not described in member list List, or when the result of verifying a indicates "not acceptable," subsequent operations are aborted. When the ID is described in member list List, and σ is accepted using verification key vk corresponding to the ID, signature generation section 61-3 of the group, which has received signing key sk_g=(p_g, q_g) of the group, first calculates H'_g(nonce||C) using signing key sk_g=(p_g, q_g) of the group. Next, signature generation section 61-3 selects at random (k'+1)-bit prime number e_g different from e'_g and element y'_g of QR(n_g), and calculates x'_g which satisfies $y'\_^{\{e'\_g\}} = x' \cdot h\_g^{\{H'\_g(nonce||C)\}} \bmod n\_g$. Similarly, signature generation section 61-3 calculates y_g which satisfies $y\_g^{\{e\_g\}} = x\_g \cdot h\_g^{\{H'\_g(x')\}} \bmod n\_u$. Assume that signature data is σ_g=(e_g, y_g, y'_g). Further, signature generation section 61-3 transmits authentication assist data ans_h=(nonce, C, σ_g) to authentication-subjected user device 21. Unlinkable authentication data generation section 21-6, which has received authentication assist data ans_h, transmits unlinkable authentication data response=ans_h to verification device 31.

Verification section 31-2, which has received the unlinkable authentication data response and verification key vk_g of the group, first confirms that e_g is a (k'+1)-bit prime number different from e'_g, using verification key vk_g=((n_g, h_g, x_g, e'_g), H'_g). Next, verification section 31-2 calculates x'_g=(y'_g)^{e'_g}·h_g^{−H'_g(nonce∥C)}, and confirms that x_g=(y_g)^{e_g}·h_g^{−H_g(x'_g)} is established. When the equation is established, the signature is determined as accepted, whereas when the equation is not established, the signature is determined as not accepted. Also, when the result of the verification indicates "not acceptable," verification section 31-2 outputs result (authentication result) as unsuccessful authentication. However, even unlinkable authentication data which is unsuccessfully authenticated may be stored in unlinkable authentication data storage device 31-3.

Since the process for identifying a user who is to be authenticated from the unlinkable authentication data is similar to Example 1, the description thereof is omitted.

Third Specific Example

This specific example presents a specific example in which the anonymous authentication system according to the third embodiment is implemented using a public key encryption scheme, an electronic signature scheme, and a message authentication scheme.

The message authentication scheme involves a guarantee for the identity of messages, and ensures that a message is not corrupted by disruptive action such as a computer virus, unauthorized access and the like. In this specific example, a public key encryption scheme for use by the present invention may be the Cramer-Shoup encryption scheme; an electronic signature scheme may be the Cramer-Shoup signature scheme; and a message authentication scheme may be a message authentication scheme described, for example, in the article: Mihir Bellare, Ran Canetti, Hugo Krawczyk, "Keying Hash Functions for Message Authentication," In Advances in Cryptology—Crypto '96, LNCS 1109, 1996 (Reference 6) (hereinafter represented by HMAC). Hash function H is used for HMAC. An arbitrary hash function such as MD5, SHA-1, SHA-224, SHA-256 and the like may be used for the hash function. When a secret key is represented by K, HMAC for message m can be defined as follows:

$$HMAC\_\{K\}(m)=h((K \text{ XOR opad})\|h((K+ipad)\|m))$$

where XOR represents a bit-by-bit exclusive logical OR. Specifically, when A=1001 and B=1100, (A XOR B)=0101 stands. Also, opad and ipad are constants, the length of which is the block length size of the hash function, where opad=0x5c5c5c...5c, and ipad=0x363636...36 are defined, respectively. For example, when a hash function having a block length of 256 bits is used, opad and ipad present values which consist of 32 continuous 0x5c and 0x36, respectively. In the following, HMAC_{K}(m) is referred to as MAC value of m.

Next, operations for implementing the present invention will be described in connection with a specific example.

This specific example presents a specific example in which the anonymous authentication system according to the third embodiment of the present invention is implemented or realized using the Cramer-Shoup encryption scheme, Cramer-Shoup signature scheme, and HMAC. Assume herein, by way of example, that encryption key enc_g=(G, g_1, g_2, (c_g, d_g, h_g), H_g) of the Cramer-Shoup encryption has been open to the public as encryption key enc_g of a group. Assume also that corresponding decryption key dec_g is dec_g=(x_{g,1}, x_{g,2}, y_{g,1}, y_{g,2}, z_{g,1}, z_{g,2}). Further, in the following description to be given, user U who attempts to participate in the group has signing key sk_u=(p_u, q_u) of the Cramer-Shoup signature, and corresponding verification key vk_u=((u_n, h_u, x_u, e'_u), H'_u). Also, authentication assistant device 62 and verification assistant device 42 share a secret key of HMAC as common key ck_g=K for authentication.

Since a pre-authentication process (sign-up registration process) in this specific example is similar to the pre-authentication process (sign-up registration process) of the first specific example, a description thereon is omitted.

The flow of an authentication process will be described.

First, authentication request section 21-3 of authentication-subjected user device 21 transmits authentication request req_a to verification device 31. Authentication request req_a may be a fixed text defined by the system. Challenge generation section 30-1, which has received authentication request req_a, selects a nonce at random, and transmits the nonce to authentication-subjected user device 21. Signature generation section 21-4, which has received the challenge nonce, calculates H'_u(nonce) using sk_u stored in ID/key pair storage device 21-2. Next, signature generation section 21-4 selects at random (k'+1)-bit prime number e which is different from e'_u and element y' of QR(n_u), and calculates x'_u which satisfies y'^{e'_u}=x'·h_u^{H'_u(nonce)} mod n_u. Similarly, signature generation section 21-4 calculates y which satisfies y_u^{e}=x_u·h_u^{H'_u(x')} mod n_u. Assume that signature data is σ=(e,y,y'). Next, unlinkable authentication data generation section 21-5, which has received encryption key enc_g=(G, g_1, g_2, (c_g, d_g, h_g), H_g) of the group, selects random value k from Z_{q}. Unlinkable authentication data generation section 21-5 further calculates u_1=g_1^{k}, u_2=g_2^{k}, e=h_g^{k}·(ID_u∥σ), αH_g(u_1, u_2, e), and v=c_g^{k}d_g^{k·α}. Assume that encrypted text C is (u_1, u_2, e, v). Unlinkable authentication data generation section 21-5 further transmits an unlinkable authentication data response=(nonce, C) to authentication assistant device 62.

Decryption section 62-1, which has received authentication assist request data req_h and decryption key dec_g= (x_{g,1}, x_2}, y_{g,1}, y_{g,2}, z_{g,1}, z_{g,2}) of the group, calculates α=H_g(u_1, u_2, e) from encrypted text C included in authentication assist request data req_h, and confirms that v=u_1^{x_{g,1}+α·y_{g,1}}·u_2^{x_{g,2}+α·y_{g,2}} is established. If the equation is not established, subsequent processing is aborted on the assumption that an undecryptable encrypted text has been sent. When the equation is established, decryption section 62-1 calculates m=e/ (u_1^{z_{g,1}}·u_2^{z_{g,2}}) to reconstruct message m. Decryption section 62-1 further parses the resulting message m into ID∥σ. In other words, m is decomposed into ID and σ=(e,y,y').

Next, signature verification section 62-2, which has received member list List stored in member registration information storage device 10-2 of group management device 10, determines whether or not the ID is described in member list List. When the ID is described in member list List, signature verification section 62-2 first confirms that e is a (k'+1)-bit prime number which is different from e', using verification key vk corresponding to the ID. Next, signature verification section 62-2 calculates x'=(y') ^{e}·h^{−H'(nonce)}, and confirms that x=(y)^{e}·h^{−H(x')} is established. When the equation is established, the signature is determined as accepted, whereas when the equation is not established, the signature is determined as not accepted. When the ID is not described in member list List, or when the result of verifying a indicates "not acceptable," subsequent operations are aborted. When the ID is described in member list List, and σ is accepted using verification key vk corresponding to the ID, message authenticator generation generation section 62-3, which has received common key ck_g(K) for authentication, calculates MAC value τ=HMAC_{K} (nonce||C) of nonce||C, using common key ck_g(K) for authentication. Authenticator generation generation section 62-3 further transmits authentication assist data ans_h=(nonce, C, τ) to authentication-subjected user device 21. Unlinkable authentication data generation section 21-6, which has received authentication assist data ans_h, transmits unlinkable authentication data response=ans_h to verification device 30. Verification assist request section 30-2, which has received the unlinkable authentication data response, transmits verification assist request data req_v=response to verification assistant device 42. Message authenticator verification section 42-1, which has received authentication assist request data req_v and common key ck_g=(K) for authentication, calculates MAC value τ'=HMAC_{K}(nonce||C) of nonce||C, using common key ck_g(K) for authentication. τ'τ is confirmed. Specifically, message authenticator verification section 42-1 transmits verification assist data ans_v which indicates "acceptable" to verification device 30 when τ'=τ, and transmits verification assist data ans_v which indicates "not acceptable" to verification device 30 when τ'≠. Verification section 30-3, which has received verification auxiliary data ans_v, outputs result (authentication result) as successful authentication when verification data ans_v indicates "acceptable," and outputs result (authentication result) as unsuccessful authentication when verification assist data ans_v indicates "not acceptable." Further, the unlinkable authentication data response which has resulted in successful authentication is stored in unlinkable authentication data storage device 30-4. However, even unlinkable authentication data which has resulted in unsuccessful authentication may also be stored in unlinkable authentication data storage device 30-4. Since the process for identifying a user who is to be authenticated from the unlinkable authentication data is similar to the first specific example, the description thereof is omitted.

Fourth Specific Example

In the first specific example, steps 201 and 202 can be omitted, and arbitrary message m selected by the authentication-subjected user device can be utilized instead of the challenge nonce. In this event, the unlinkable authentication data response serves as unlinkable signature data. While the unlinkable signature data is transmitted simply as representative of a signature of a member belonging to the group to a verification device which does not have decryption key dec_g of the group as an input, the authentication-subjected user identification device can identify the ID of a member who has attached the signature. Also, it is the nature of the unlinkable signature data that from two items of unlinkable signature data it cannot be determined whether they are signatures of the same member or signatures of different members. Similarly, steps 401 and 402 can be omitted in the second specific example, while steps 501 and 502 can be omitted in the third specific example, and arbitrary message m selected by the authentication-subjected user device can be utilized instead of challenge nonce.

Fifth Specific Example

In this example, a business model of the anonymous authentication system of the present invention will be specifically described giving the first embodiment as an example.

In the anonymous authentication system shown in FIG. 1, group management device 10 is operated, for example, by an operator which manages groups (hereinafter referred to as "group management operator"). The group management operator may be, for example, an Internet service provider. Authentication-subjected user device 20 is operated, for example, by a user. The user may be, for example, a member of the Internet service provider. Verification device 30 is operated, for example, by an operator who confirms that users are registered and provides services (hereinafter referred to as "service provider"). The service provider may be, for example, an access point in a public wireless LAN service. Verification assistant device 40 is operated, for example, by an operator who is connected to verification device 30 through the Internet or the like to respond to a verification assist request from verification device 30 (hereinafter referred to as "verification assistant operator"). The verification assistant operator may be, for example, an on-line verification section of the Internet service provider. Authentication-subjected user identification device 50 is operated, for example, by an operator who prevents, when required, a user who is to be authenticated from remaining anonymous (hereinafter referred to as "authentication-subjected user identification operator"). The authentication-subjected user identification operator may be, for example, an accounting section of the Internet service provider.

In such a business model, the group management operator first determines encryption key enc_g of a group, and decryption key dec_g of the group corresponding to encryption key enc_g, and opens encryption key enc_g of the group, together with information related to the group, on newspaper, home page or the like, by way of example. Further, group management operator sends decryption key dec_g of the group to the verification assistant operator and authentication-subjected user identification operator. Next, a user wishes to join the group managed by the group management operator. The group management operator determines whether or not the user who wishes to join the group meets conditions for joining the group (age and the like), and performs an admission procedure for the user (for example, issuing and sending a membership card to the user) if the user meets the conditions.

Next, the user enters encryption key enc_g of the group into authentication-subjected user device 20, and causes the same to transmit unlinkable authentication data to verification device 30 (for example, the user sends authentication data which proves that the user is a member of the Internet service provider when the user is to utilize a wireless LAN service). Verification device 30, which has received the unlinkable authentication data, transmits a verification assist request to verification assistant device 40, and acquires verification assist data, thereby performing verification and outputting an authentication result (for example, an access point confirms that the user is a member of the Internet service provider, and provides a wireless LAN service). Further, the verification operator instructs authentication-subjected user identification device 50 to transmit an authentication-subjected user identification request including unlinkable authentication data of each user. The authentication-subjected user identification operator receives the unlinkable authentication data thus transmitted to identify a user who is to be authenticated. For example, the authentication-subjected user identification operator identifies a user who has utilized a wireless LAN service to charge the user in accordance with his utilization conditions.

In this regard, the group management operator, verification assistant operator, and authentication-subjected user identification operator may be different operators or the same operator.

While a specific example has been shown above for a business model of the anonymous authentication system according to the first embodiment, a similar business model is possible in the other embodiments. However, in the anonymous authentication system according to the second or third embodiment, the authentication assistant device is operated, for example, by an operator who serves to assist in authentication (hereinafter called the "authentication assistant operator"). In this regard, the group management operator and authentication assistant operator may be the same operator.

Functions of each device may be executed by recording a program for implementing the functions on a computer readable recording medium, and by reading the program recorded on the recording medium into a computer. The computer readable recording medium may be a recording medium such as a flexible disk, a magneto-optical disk, a CD-ROM and the like, and a storage device such as a hard disk drive built in a computer system. Further, the computer readable recording medium includes a medium (transmission medium or transmission wave) for dynamically carrying a program for a short time, like the case where a program is transmitted through the Internet, and a medium for holding a program for a certain time period, like a volatile memory within a computer which serves as a server in that case.

While preferred embodiments of the present invention have been described using particular terms, it should be understood that such a description is intended only for illustration, and a variety of alterations and modifications can be made without departing from the following claims.

This application claims priority based on Japanese Patent Application No. 2007-137852 filed on May 24, 2007, the disclosure of which is incorporated herein by reference in its entirety.

INDUSTRIAL AVAILABILITY

The present invention can be suitably applied to anonymous authentication which authenticates users through a communication network while keeping the IDs of the users secret.

The invention claimed is:

1. An anonymous authentication system comprising a group management device for managing a group of users, an authentication-subjected user device for requesting verification as to whether or not a user who is to be authenticated belongs to the group, in accordance with the user's operation, a verification device for receiving the verification request and for verifying that the user who is to be authenticated and who has requested the authentication belongs to the group, a verification assistant device for assisting in the verifying operation, and an authentication-subjected user identification device for identifying the user who is to be authenticated, wherein:

said authentication-subjected user device generates unlinkable authentication data from open information of the group to which the user to be authenticated belongs, open information and secret information which are unique to the user to be authenticated, and an information nonce which is generated at each authentication, said verification assistant device extracts information regarding the open information and public information which are unique to the user from said unlinkable authentication data using secret information which corresponds to the open information of said group, authenticates, from the extracted information regarding the open information and public information which are unique to the user and from a list of user's open information which is managed by the group, that the user who belongs to the group has generated said unlinkable authentication data, and generates authentication assistant data including the result of the authentication, said verification device receives said unlinkable authentication data from said authentication-subjected user device, transmits said unlinkable authentication data to said verification assistant device, receives from said verification assistant device verification assist data for said transmitted unlinkable authentication data, verifies using said verification assist data that the user to be authenticated belongs to the group, and generates from the result the verification result as to whether or not the user who is to be authenticated belongs to the group, said authentication-subjected user identification device identifies the user who is to be authenticated and who corresponds to said unlinkable authentication data from said unlinkable authentication data, the secret key of the group and the list of user's open information which is managed by the group, wherein said verification device carries out an anonymous authentication of the user who is to be authenticated based on an identification of the user by the verification assistant device.

2. An anonymous authentication system comprising a group management device for managing a group of users, an authentication-subjected user device for requesting verification as to whether or not a user who is to be authenticated belongs to the group, in accordance with the user's operation, a verification device for receiving the verification request and for verifying that the user who is to be authenticated and who has requested the authentication belongs to the group, a authentication assistant device for assisting in the authenticating operation, a verification assistant device for assisting in the verifying operation, and an authentication-subjected user identification device for identifying the user who is to be authenticated, wherein:

said authentication-subjected user device generates an authentication assist request from open information of the group to which the user to be authenticated belongs, open information and secret information which are unique to the user, and an information nonce which is generated at each authentication, said authentication assistant device responds to the authentication assist request, extracts information regarding the open information and secret information which are unique to the user from secret information which corresponds to the open information of the group and the authentication assist request, verifies, from a list of user's open information which is managed by the group, that the user who belongs to the group has generated said authentication assist request, and generates authentication assist data from the result of the verification, the open information and secret information of the group, said authentication-subjected user device generates unlinkable authentication data including the authentication assist data received from said verification assistant device which has responded to the authentication assist request, said verification device verifies, from said unlinkable authentication data and the open information of the group, that the authentication assist data included in said unlinkable authentication data is data which is generated using the open information and secret information of the group to obtain the result of verification as to whether or not the user who is to be authenticated belongs to the group, and said authentication-subjected user identification device identifies the user who is to be authenticated and who corresponds to said unlinkable authentication data from said unlinkable authentication data, the secret key of the group and the list of user's open information which is managed by the group, wherein said verification device carries out an anonymous authentication of the user who is to be authenticated based on an identification of the user by the verification assistant device.

3. An anonymous authentication system comprising a group management device for managing a group of users, an authentication-subjected user device for requesting verification as to whether or not a user who is to be authenticated belongs to the group, in accordance with the user's operation, a verification device for receiving the verification request and for verifying that the user who is to be authenticated and who has requested the verification belongs to the group, an authentication assistant device for assisting in the authenticating operation, a verification assistant device for assisting in the verifying operation, and an authentication-subjected user identification device for identifying the user who is to be authenticated, wherein:

said authentication-subjected user device generates an authentication assist request from open information of the group, open information and secret information which are unique to the user, and an information nonce which is generated at each authentication, said authentication assistant device responds to the authentication assist request, extracts information regarding the open information and secret information which are unique to the user from secret information which corresponds to the open information of the group and the authentication assist request, verifies, from a list of user's open information which is managed by the group, that the user who belongs to the group has generated said authentication assist request, and generates authentication assist data from the result of the verification and the open information of the group, said verification assistant device extracts information regarding the open information and public information which are unique to the user from unlinkable authentication data using secret information which corresponds to the open information of said group, verifies, from the list of user's open information which is managed by the group, that the user who belongs to the group has generated said unlinkable authentication data, and generates verification assist data from the result of the verification, said verification device receives said unlinkable authentication data from said authentication-subjected user device, transmits verification assist request including said unlinkable authentication data to said verification assistant device, receives the verification assist data from said verification assistant device which has responded to the verification assist request, and generates from the verification assist data result of verification as to whether or not the user who is to be authenticated belongs to the group, said authentication-subjected user identification device identifies the user who is to be authenticated and who corresponds to said unlinkable authentication data from said unlinkable authentication data, the secret key of the group and the list of user's open information which is managed by the group, wherein said verification device carries out an anonymous authentication of the user who is to be authenticated based on an identification of the user by the verification assistant device.

4. The anonymous authentication system according to claim 1, wherein:

said group management device comprises:
  a registration processing section for, when a user registers in the group, receiving a registration request including a verification key of the user, and for issuing an ID unique to the user; and
  a member registration information storage device for storing a member list which is a list of Ds of registered members and verification keys that correspond to the registered members, said authentication-subjected user device comprises:
  a registration request section for, when a user enters the group, transmitting a registration request including the verification key of the user to said group management device;
  an ID/key pair storage device for storing the ID sent from said group management device and a signing key/verification key pair of the user, sent from said group management device as a result of registering the user;
  an authentication request section for, when a user undergoes authentication, transmitting an authentication request to said verification device;
  a signature generation section for generating a signature of the user corresponding to the ID stored in said ID/key pair storage device to respond to a challenge sent from said verification device as a result of the authentication request, through the use of a signing key stored in said ID/key pair storage device, and
  an unlinkable authentication data generation section for transmitting to said verification device unlinkable authentication data including an encrypted text including the ID and signature of the user which are encrypted using an encryption key of said verification assistant device, said verification device comprises:
  a challenge generation section for generating a challenge which is a random message, upon receipt of the authentication request from said authentication-subjected user device, and for transmitting the challenge to said authentication-subjected user device;
  a verification assist request section for outputting a verification assist request including said unlinkable authentication data to said verification assistant device;
  a verification section for receiving verification assist data from said verification assistant device, and for outputting an authentication result;
  an unlinkable authentication data storage device for storing said unlinkable authentication data that is received from said authentication-subjected user device; and
  an authentication-subjected user identification request section for transmitting an authentication-subjected user identification request including said unlinkable authentication data to identify the user who has generated said unlinkable authentication data to said authentication-subjected user identification device, said verification assistant device comprises:
  an authentication data decryption section for, upon receipt of said verification assist request, decrypting the encrypted text included in the verification assist request using the decryption key corresponding to the encryption key of said verification assistant device to reconstruct the ID and signature of the user; and
  a signature verification section for receiving the member list from said member registration information storage device, for verifying the signature of the user using a verification key corresponding to the ID, and for transmitting the result of the verification to said verification device as the verification assist data; and
said authentication-subjected user identification device comprises:
  an authentication data decryption section for, upon receipt of the authentication-subjected user identification request, decrypting the encrypted text included in the unlinkable authentication data using the decryption key of said verification assistant device to reconstruct the ID and signature of the user, and
  an authentication-subjected user identification section for receiving the member list and the user ID from said member registration information storage device, and for identifying a user who is to be authenticated and who corresponds to the unlinkable authentication data.

5. The anonymous authentication system according to claim 2, wherein:
said group management device comprises:
  a registration processing section for, when a user registers in the group, receiving a verification key of the user, and for issuing an ID unique to the user; and
  a member registration information storage device for storing a member list which is a list of IDs of registered members and verification keys that correspond to the registered members,
said authentication-subjected user device comprises:
  a registration request section for, when a user enters the group, transmitting a registration request including the verification key of the user to said group management device;
  an ID/key pair storage device for storing the ID sent from said group management device and a signing key/verification key pair of the user sent from said group management device as a result of registering the user;
  an authentication request section for, when a user undergoes authentication, transmitting an authentication request to said verification device;
  a signature generation section for generating a signature of the user corresponding to the ID stored in said ID/key pair storage device to respond to a challenge sent from said verification device as a result of the authentication request, through the use of a signing key stored in said ID/key pair storage device,
  an authentication assist request section for transmitting to said authentication assistant device an authentication assist request to request an authentication assisting operation for generating authentication assist data, said request including an encrypted text including the ID and signature of the user which are encrypted using an encryption key of the group, and
  an unlinkable authentication data generation section for receiving authentication assist data from said authentication assistant device, and for transmitting to said verification device unlinkable authentication data including a signature included in said authentication assist data,
said authentication assistant device comprises:
  a decryption section for, upon receipt of the authentication assist request, decrypting the encrypted text included in the authentication assist request using the decryption key of the group to reconstruct the ID and signature of the user;
  a signature verification section for receiving the member list from said member registration information storage device, for verifying the signature of the user using the verification key corresponding to the ID, and for transmitting the result of the verification to said authentication-subjected user device as the authentication assist data; and
  a group signature generation section for generating a signature of the group from an encrypted text included in the authentication assist request received from said authentication-subjected user device and the signing key of the group,
said verification device comprises:
  a challenge generation section for generating a challenge nonce which is a random message, upon receipt of the authentication request from said authentication-subjected user device;
  a verification section for verifying the signature included in the unlinkable authentication data, using said unlinkable authentication data and the verification key of the group, and for outputting the result of the authentication,
  an unlinkable authentication data storage device for storing the unlinkable authentication data received from said authentication-subjected user device; and
  an authentication-subjected user identification request section for transmitting to said authentication-subjected user identification device an authentication-subjected user identification request that includes the unlinkable authentication data to identify a user who has generated the unlinkable authentication data,
said authentication-subjected user identification device comprises:
  an authentication data decryption section for, upon receipt of the authentication-subjected user identification request, decrypting the encrypted text included in the unlinkable authentication data using the decryption key of the group to reconstruct the ID and signature of the user, and
  an authentication-subjected user identification section for receiving the member list from said member registration information storage device, and for identifying from the user ID a user who is to be authenticated and who corresponds to the unlinkable authentication data.

6. The anonymous authentication system comprising according to claim 3, wherein:
said group management device comprises:
  a registration processing section for, when a user registers in the group, receiving a signature verification key of the user, and for issuing an ID unique to the user; and
  a member registration information storage device for storing a member list which is a list of IDs of registered members and verification keys that correspond to the registered members, said authentication-subjected user device comprises:
  a registration request section for, when a user enters the group, transmitting a registration request including the verification key of the user to said group management device;
  an ID/key pair storage device for storing the ID sent from said group management device and a signing key/verification key pair of the user, sent from said group management device as a result of registering the user;
  an authentication request section for, when a user undergoes authentication, transmitting an authentication request to said verification device;
  a signature generation section for generating a signature of the user corresponding to the ID stored in said ID/key pair storage device to respond to a challenge sent from said verification device as a result of the authentication request, through the use of a signing key stored in said ID/key pair storage device,
  an authentication assist request section for transmitting to said authentication assist device an authentication assist request to request an authentication assisting operation for generating authentication assist data, said request including an encrypted text including the ID and signature of the user which are encrypted using an encryption key of the group, and
  an unlinkable authentication data generation section for receiving authentication assist data from said authentication assistant device, for generating unlinkable authentication data which does not allow anyone to identify whether authentications that are carried out a plurality of times are actions performed by the same user who is to be authenticated or by different users who are to be authenticated, and for transmitting to said verification device the unlinkable authentication data including the signature included in said authentication assist data,
said authentication assistant device comprises:
  a decryption section for, upon receipt of the authentication assist request, decrypting the encrypted text included in the authentication assist request using the decryption key of the group to reconstruct the ID and signature of the user;
  a signature verification section for receiving the member list from said member registration information storage device, for verifying the signature of the user using the verification key corresponding to the user ID, and for transmitting the result of the verification to said authentication-subjected user device as the authentication assist data; and
  a message authenticator generation section for receiving a common key for authentication, and for generating a message authenticator for the encrypted text included in the authentication assist request received from said authentication-subjected user device,
said verification device comprises:
  a challenge generation section for generating a challenge which is a random message, upon receipt of the authentication request from said authentication-subjected user device;
  a verification assist request section for outputting a verification assist request including said encrypted text to said verifications assistant device,
  a verification section for receiving the unlinkable authentication data and the authentication key of the group, for verifying the signature included in the unlinkable authentication data, and for outputting the result of the authentication,
  an unlinkable authentication data storage device for storing the unlinkable authentication data received from said authentication-subjected user device; and
  an authentication-subjected user identification request section for transmitting to said authentication-subjected user identification device an authentication-subjected user identification request that includes the unlinkable authentication data,
said verification assistant device comprises a message authenticator generation section for attaching a message authenticator to the encrypted text included in the verification assist request upon receipt of the verification assist request and the common key for authentication,
said authentication-subjected user identification device comprises:
  an authentication data decryption section for, upon receipt of the authentication-subjected user identification request, decrypting the encrypted text included in the unlinkable authentication data using the decryption key of the group to reconstruct the ID and signature of the user, and
  an authentication-subjected user identification section for receiving the member list from said member registration information storage device, and for identifying a user who is to be authenticated and who corresponds to the unlinkable authentication data.

7. The anonymous authentication system comprising according to claim 1, wherein:
  said group management device comprises:
    a registration processing section for, when a user registers in the group, receiving a registration request including a verification key of the user, and for issuing an ID unique to the user;
  said authentication-subjected user device comprises:
    a signature generation section for generating a signature of the user corresponding to the ID to respond to a challenge sent from said verification device as a result of the authentication request, through the use of a signing key,
  said authentication-subjected user identification device comprises:
    an authentication data decryption section for, upon receipt of the authentication-subjected user identification request, decrypting the encrypted text included in the unlinkable authentication data using the decryption key of the group to reconstruct the signature of the user.

8. The anonymous authentication system comprising according to claim 2, wherein:
  said group management device comprises:
    a registration processing section for, when a user registers in the group, receiving a registration request including a verification key of the user, and for issuing an ID unique to the user;
  said authentication-subjected user device comprises:
    a signature generation section for generating a signature of the user corresponding to the ID to respond to a challenge sent from said verification device as a result of the authentication request, through the use of a signing key,
  said authentication-subjected user identification device comprises:
    an authentication data decryption section for, upon receipt of the authentication-subjected user identification request, decrypting the encrypted text included in the unlinkable authentication data using the decryption key of the group to reconstruct the signature of the user.

9. The anonymous authentication system comprising according to claim 3, wherein:

said group management device comprises:

a registration processing section for, when a user registers in the group, receiving a registration request including a verification key of the user, and for issuing an ID unique to the user;

said authentication-subjected user device comprises:

a signature generation section for generating a signature of the user corresponding to the ID to respond to a challenge sent from said verification device as a result of the authentication request, through the use of a signing key, said authentication-subjected user identification device comprises:

an authentication data decryption section for, upon receipt of the authentication-subjected user identification request, decrypting the encrypted text included in the unlinkable authentication data using the decryption key of the group to reconstruct the signature of the user.

* * * * *